(12) United States Patent
Musha

(10) Patent No.: US 11,189,308 B2
(45) Date of Patent: Nov. 30, 2021

(54) MAGNETIC TAPE READING APPARATUS CAPABLE OF SYNTHESIZING A PLURALITY OF REPRODUCING SIGNAL SEQUENCES

(71) Applicant: FUJIFILM Corporation, Tokyo (JP)

(72) Inventor: Atsushi Musha, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/822,132

(22) Filed: Mar. 18, 2020

(65) Prior Publication Data
US 2020/0312356 A1  Oct. 1, 2020

(30) Foreign Application Priority Data
Mar. 29, 2019  (JP) .............................. JP2019-066144

(51) Int. Cl.
| G11B 5/584 | (2006.01) |
| G11B 5/49  | (2006.01) |
| G11B 5/55  | (2006.01) |
| G06F 3/06  | (2006.01) |
| G11B 5/00  | (2006.01) |

(52) U.S. Cl.
CPC .......... *G11B 5/4938* (2013.01); *G06F 3/0658* (2013.01); *G06F 3/0682* (2013.01); *G11B 5/5508* (2013.01); *G06F 3/0607* (2013.01); *G11B 2005/0013* (2013.01)

(58) Field of Classification Search
None
See application file for complete search history.

(56) References Cited

U.S. PATENT DOCUMENTS

| 5,771,333  | A  | * | 6/1998  | Hirayama | .............. H04N 5/923 |
|            |    |   |         |          | 386/201 |
| 9,263,065  | B2 |   | 2/2016  | Bui et al. | |
| 10,242,709 | B1 | * | 3/2019  | Yamamoto | ......... G11B 20/1886 |
| 10,262,688 | B1 | * | 4/2019  | Biskeborn | ............ G11B 5/0083 |
| 10,692,528 | B2 | * | 6/2020  | Ozawa | ............ G11B 20/10046 |
| 10,755,735 | B2 | * | 8/2020  | Ozawa | ...................... G11B 5/71 |
| 10,811,048 | B2 | * | 10/2020 | Ozawa | ............... G11B 5/70678 |
| 11,017,805 | B2 | * | 5/2021  | Kaneko | ................... G11B 5/588 |

(Continued)

FOREIGN PATENT DOCUMENTS

| JP | 03-132901 A | 6/1991 |
| JP | 07-134868 A | 5/1995 |

(Continued)

OTHER PUBLICATIONS

Communication dated Oct. 19, 2021, issued by the Japanese Patent Office in counterpart Japanese Application No. 2019-066144.

*Primary Examiner* — Tan X Dinh
(74) *Attorney, Agent, or Firm* — Sughrue Mion, PLLC

(57) ABSTRACT

A magnetic tape reading apparatus including: a reading head which includes a reading unit disposed at a position corresponding to a single track included in a magnetic tape; a controller which controls the reading unit to read data plural times from a specific range of the single track in a running direction of the magnetic tape by a linear scan method; and a synthesis unit which synthesizes a plurality of reproducing signal sequences obtained by reading data plural times from the specific range by the reading unit.

15 Claims, 20 Drawing Sheets

(56) References Cited

U.S. PATENT DOCUMENTS

| | | | |
|---|---|---|---|
| 2004/0264923 A1* | 12/2004 | Ido | G11B 15/125 |
| | | | 386/287 |
| 2016/0365110 A1* | 12/2016 | Furrer | G11B 20/10046 |
| 2018/0233169 A1* | 8/2018 | Biskeborn | G11B 5/4893 |
| 2020/0251138 A1* | 8/2020 | Ozawa | G11B 5/70 |
| 2020/0251139 A1* | 8/2020 | Kasada | G11B 5/00813 |
| 2020/0273489 A1* | 8/2020 | Kaneko | G11B 5/00826 |
| 2020/0273490 A1* | 8/2020 | Naoi | G11B 5/70678 |
| 2020/0312356 A1* | 10/2020 | Musha | G11B 5/4938 |

FOREIGN PATENT DOCUMENTS

| | | |
|---|---|---|
| JP | 09-171605 A | 6/1997 |
| JP | 10-269505 A | 10/1998 |
| JP | 2001-143218 A | 5/2001 |
| JP | 2001-273605 A | 10/2001 |
| JP | 2005-056507 A | 3/2005 |
| JP | 2015-529928 A | 10/2005 |

* cited by examiner

MAGNETIC TAPE READING APPARATUS CAPABLE OF SYNTHESIZING A PLURALITY OF REPRODUCING SIGNAL SEQUENCES

CROSS-REFERENCE TO RELATED APPLICATIONS

This application claims priority under 35 USC 119 from Japanese Patent Application No. 2019-066144 filed Mar. 29, 2019, the disclosure of which is incorporated by reference herein.

BACKGROUND

1. Technical Field

A technology of the present disclosure relates to a magnetic tape reading apparatus, an operation method of a magnetic tape reading apparatus, and a program.

2. Description of the Related Art

JP1991-132901A (JP-H3-132901A) discloses a magnetic recording and reproducing device increasing a signal-to-noise ratio by repeatedly reproducing recorded information and obtaining an arithmetical mean.

However, JP1991-132901A (JP-H3-132901A) does not disclose a solution in a case where a reproducing signal is omitted. The omitted data can be complemented by reproducing plural times. As a technology relating to this, JP1997-171605A (JP-H9-171605A) discloses a digital data reproducing device which reproduces each track plural times in a helical scan method, and reconstructs reproducing data for one track of each of the track from the reproducing signal obtained by the reproducing.

SUMMARY

However, a technology disclosed in JP1997-171605A (JP-H9-171605A) is a technology using a helical scan method, and accordingly, reading of data and tracking control with respect to a magnetic tape may not be synchronously performed. Accordingly, in the helical scan method, off-track occurs with high frequency, compared to a linear scan method. In a case where the off-track occurs, a reproducing signal obtained by reading data from a magnetic tape may be omitted. The omission of the reproducing signal causes a decrease in a signal-to-noise ratio of a reproducing signal sequence which is a time sequence of a reproducing signal. In addition, the off-track occurring due to deformation and sharp vibration of a magnetic tape, and jitter during running of a magnetic tape also causes a decrease in a signal-to-noise ratio of a reproducing signal.

An object of one embodiment of the invention is to provide a magnetic tape reading apparatus capable of preventing a deterioration in reliability of data read from tracks by a linear scan method, compared to a case where data is read by only one time of reading from tracks by a linear scan method, an operation method of a magnetic tape reading apparatus, and a program.

According to a first aspect according to the technology of the disclosure, there is provided a magnetic tape reading apparatus including: a reading head which includes a reading unit disposed at a position corresponding to a single track included in a magnetic tape; a controller which controls the reading unit to read data plural times from a specific range of the single track in a running direction of the magnetic tape by a linear scan method; and a synthesis unit which synthesizes a plurality of reproducing signal sequences obtained by reading data plural times from the specific range by the reading unit. Therefore, compared to a case where data is read by reading only one time from the track by a linear scan method, it is possible to prevent a deterioration in reliability of data read from tracks by the linear scan method.

According to a second aspect according to the technology of the disclosure, there is provided a magnetic tape reading apparatus including: a reading head which includes a plurality of reading units disposed at positions respectively corresponding to a plurality of tracks included in a magnetic tape; a controller which controls each of the plurality of reading units to read data plural times from a specific range of a single track having the corresponding position among the plurality of tracks, in a running direction of the magnetic tape, by a linear scan method; and a synthesis unit which synthesizes a plurality of reproducing signal sequences obtained by reading data plural times from the specific range by each of the plurality of reading units. Therefore, compared to a case where data is read by reading only one time from the track by a linear scan method, it is possible to prevent a deterioration in reliability of data read from tracks by the linear scan method.

According to a third aspect according to the technology of the disclosure, the magnetic tape reading apparatus according to the second aspect further includes: a first movement mechanism capable of moving the reading head in a width direction of the magnetic tape, in which the magnetic tape has a plurality of sets of the plurality of tracks in a width direction, and the controller controls the first movement mechanism to move the reading head to a position where the plurality of reading units are to be disposed on the plurality of tracks of a designated set among the plurality of sets, and controls each of the plurality of reading units to read data plural times from the specific range of the single track of the designated set. Therefore, compared to a case where data is read by reading only one time from the track by a linear scan method, it is possible to prevent a deterioration in reliability of data read from the track by a linear scan method, even in a case where the magnetic tape includes the plurality of sets of the plurality of tracks in the width direction.

According to a fourth aspect according to the technology of the disclosure, in the magnetic tape reading apparatus according to any one of the first to third aspects, reading paths for plural times of reading operations with respect to the specific range by the reading unit are reading paths different from each other depending on environmental conditions affecting at least one of the magnetic tape or the reading unit for each of the plural times of reading operations in the specific region. Therefore, compared to a case where reading paths for plural times of reading operations with respect to the specific range by the reading unit completely coincide with each other, it is possible to increase a signal-to-noise ratio of a reproducing signal obtained by reading data.

According to a fifth aspect according to the technology of the disclosure, the magnetic tape reading apparatus according to any one of the first to fourth aspects further includes: a second movement mechanism capable of moving the reading head in a width direction of the magnetic tape, and the controller controls the second movement mechanism to vary reading paths for plural times of reading operations with respect to the specific range by the reading unit, by moving the reading head in the width direction. Therefore, compared to a case where the reading of the data of the single track is performed by a single reading element, it is possible to widen a reading range of data in a width direction of the single track.

According to a sixth aspect according to the technology of the disclosure, in the magnetic tape reading apparatus according to any one of the first to fifth aspects, the reading unit includes a plurality of reading elements along the running direction of the magnetic tape with respect to the single track, and the controller controls each of the plurality of reading elements to read data from the specific range to thereby control the reading unit to read data plural times from the specific range. Therefore, compared to a case where data in the specific range is read plural times by only single reading element, it is possible to read data in the specific range plural times for a short period of time.

According to a seventh aspect according to the technology of the disclosure, in the magnetic tape reading apparatus according to any one of the first to fifth aspects, the reading unit includes one reading element for each single track, and the controller controls the reading element to read data plural times from the specific range. Therefore, compared to a case where data is read by reading only one time from the single track by a linear scan method, it is possible to prevent a deterioration in reliability of data read from the single track by a linear scan method.

According to an eighth aspect according to the technology of the disclosure, the magnetic tape reading apparatus according to any one of the first to seventh aspects further includes: a signal processing unit which performs signal processing with respect to the reproducing signal sequence. Therefore, compared to a case where the signal processing is not performed with respect to the reproducing signal sequence, it is possible to increase reliability of a final signal output from the magnetic tape reading apparatus.

According to a ninth aspect according to the technology of the disclosure, in the magnetic tape reading apparatus according to the eighth aspect, the signal processing is a process including a phase synchronization process of synchronizing a phase of the reproducing signal sequence in the running direction. Therefore, compared to a case where the phase synchronization process is not performed with respect to the reproducing signal sequence, it is possible to increase reliability of a final signal output from the magnetic tape reading apparatus.

According to a tenth aspect according to the technology of the disclosure, in the magnetic tape reading apparatus according to the eighth or ninth aspect, the signal processing is a process including a waveform equalization process with respect to each of the plurality of reproducing signal sequences. Therefore, compared to a case where the waveform equalization process is not performed with respect to each of the plurality of reproducing signal sequences, it is possible to increase reliability of a final signal output from the magnetic tape reading apparatus.

According to an eleventh aspect according to the technology of the disclosure, in the magnetic tape reading apparatus according to the tenth aspect, the waveform equalization process is a waveform equalization process by a two-dimensional FIR filter or a waveform equalization process by a two-dimensional IIR filter. Therefore, compared to a case where the waveform equalization process by a one-dimensional FIR filter or IIR filter is performed with respect to only one reproducing signal sequence among the plurality of reproducing signal sequences obtained by reading data plural times, it is possible to increase reliability of a final signal output from the magnetic tape reading apparatus.

According to a twelfth aspect according to the technology of the disclosure, in the magnetic tape reading apparatus according to the eleventh aspect, a parameter used in the two-dimensional FIR filter and the two-dimensional IIR filter is determined in accordance with a deviation amount of positions between the single track and the reading unit. Therefore, compared to a case where a tap coefficient is determined in accordance with a parameter not relevant to the deviation amount, it is possible to increase accuracy of the waveform equalization process by the two-dimensional FIR filter and accuracy of the waveform equalization process by the two-dimensional IIR filter.

According to a thirteenth aspect according to the technology of the disclosure, in the magnetic tape reading apparatus according to the twelfth aspect, the reading head includes a servo element, and the deviation amount is determined in accordance with a result obtained by reading a servo pattern applied to the magnetic tape in advance, by the servo element. Therefore, compared to a case where the servo pattern is not applied to the magnetic tape, it is possible to easily determine the deviation amount.

According to a fourteenth aspect according to the technology of the disclosure, in the magnetic tape reading apparatus according to the thirteenth aspect, a reading operation by the reading head is performed in synchronous with a reading operation by the servo element. Therefore, compared to a case of a helical scan method not capable of reading by synchronizing the servo pattern and the data, it is possible to decrease an occurrence frequency of the off-track.

According to a fifteenth aspect according to the technology of the disclosure, there is provided an operation method of a magnetic tape reading apparatus including a reading head including a reading unit disposed at a position corresponding to a single track included in a magnetic tape, the method including: controlling the reading unit to read data plural times from a specific range of the single track in a running direction of the magnetic tape by a linear scan method; and synthesizing a plurality of reproducing signal sequences obtained by reading data plural times from the specific range by the reading unit. Therefore, compared to a case where data is read by reading only one time from the track by a linear scan method, it is possible to prevent a deterioration in reliability of data read from tracks by the linear scan method.

According to a sixteenth aspect according to the technology of the disclosure, there is provided an operation method of a magnetic tape reading apparatus including a reading head which includes a plurality of reading units disposed at a positions respectively corresponding to a plurality of tracks included in a magnetic tape, the method including: controlling each of the plurality of reading units to read data from a specific range of a single track having the corresponding position among the plurality of tracks, in a running direction of the magnetic tape, by a linear scan method to thereby control the reading head to read data plural times; and synthesizing a plurality of reproducing signal sequences obtained by reading data plural times from the specific range by the reading head. Therefore, compared to a case where data is read by reading only one time from the track by a linear scan method, it is possible to prevent a deterioration in reliability of data read from tracks by the linear scan method.

According to a seventeenth aspect according to the technology of the disclosure, there is provided a program for causing a computer to function as the controller and the synthesis unit included in the magnetic tape reading apparatus according to any one of the first to fourteenth aspects. Therefore, compared to a case where data is read by reading only one time from the track by a linear scan method, it is possible to prevent a deterioration in reliability of data read from tracks by the linear scan method.

According to an eighteenth aspect according to the technology of the disclosure, there is provided a magnetic tape reading apparatus including: a reading head which includes a reading unit disposed at a position corresponding to a single track included in a magnetic tape; and a processor, in which the processor controls the reading unit to read data plural times from a specific range of the single track in a running direction of the magnetic tape by a linear scan method, and synthesizes a plurality of reproducing signal sequences obtained by reading data plural times from the specific range by the reading unit.

According to a nineteenth aspect according to the technology of the disclosure, there is provided a magnetic tape reading apparatus including: a reading head which includes a plurality of reading units disposed at a position corresponding to each of a plurality of tracks included in a magnetic tape; and a processor, in which the processor controls each of the plurality of reading units to read data plural times from a specific range of the single track having the corresponding position among the plurality of tracks, in a running direction of the magnetic tape by a linear scan method, and synthesizes a plurality of reproducing signal sequences obtained by reading data plural times from the specific range by each of the plurality of reading units.

According to one embodiment of the invention, compared to a case where data is read by reading only one time from the track by a linear scan method, an effect of preventing a deterioration in reliability of data read from tracks by the linear scan method is obtained.

BRIEF DESCRIPTION OF THE DRAWINGS

Exemplary embodiments of the present invention will be described in detail based on the following figures, wherein.

DETAILED DESCRIPTION

Hereinafter, examples of embodiments according to the technology of the disclosure will be described with reference to the accompanying drawings.

First, terms used in the following description will be described.

A CPU indicates an abbreviation of a "central processing unit". A RAM indicates an abbreviation of a "random access memory". A ROM indicates an abbreviation of a "read only memory". A ASIC indicates an abbreviation of a "application specific integrated circuit". An FPGA indicates an abbreviation of a "field-programmable gate array". A PLD indicates an abbreviation of a "programmable logic device". A SSD indicates an abbreviation of a "solid state drive". A USB indicates an abbreviation of a "universal serial bus". A/D indicates an abbreviation of "analog/digital". An FIR indicates an abbreviation of a "finite impulse response". An IIR indicates an abbreviation of an "infinite impulse response". An SNR indicates an abbreviation of a "signal-to-noise ratio". An SoC indicates an abbreviation of a "system-on-a-chip".

First Embodiment

Figure 1:
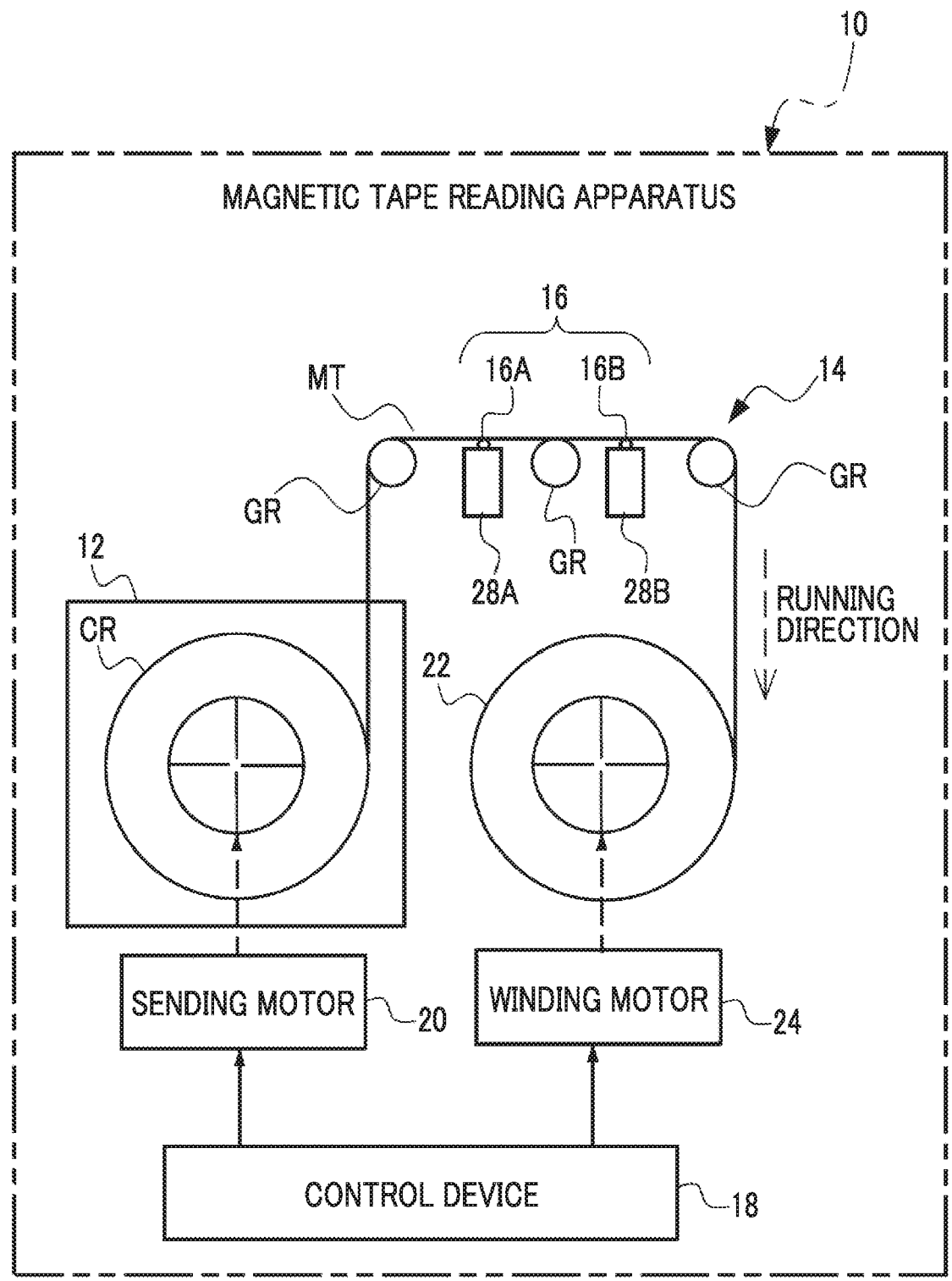
FIG. 1 is a schematic configuration view showing an example of overall configurations of a magnetic tape reading apparatus according to first to third embodiments.

As an example shown in FIG. 1, a magnetic tape reading apparatus 10 includes a magnetic tape cartridge 12, a transportation device 14, a reading head 16, and a control device 18.

The magnetic tape reading apparatus 10 is an apparatus which extracts a magnetic tape MT from the magnetic tape cartridge 12 and reads data from the extracted magnetic tape MT by using the reading head 16 by a linear scan method. In the first embodiment according to the technology of the disclosure, the reading of data indicates the reproducing of data. In the following description, data read by the reading head 16 is also referred to as a "reproducing signal".

The magnetic tape MT is generally manufactured by forming a magnetic layer including a ferromagnetic powder and any one or more kinds of additives on a non-magnetic support. Non alignment, longitudinal alignment, and vertical alignment can be applied to the magnetic layer. The magnetic layer and the like will be described in detail.

Magnetic Layer

Ferromagnetic Powder

Magnetic layer includes a ferromagnetic powder. As the ferromagnetic powder included in the magnetic layer, a well-known ferromagnetic powder can be used as one kind or in combination of two or more kinds, as the ferromagnetic powder used in the magnetic layer of various magnetic tapes MT. It is preferable to use a ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still more preferably equal to or smaller than 30 nm, still more preferably equal to or smaller than 25 nm, and still further more preferably equal to or smaller than 20 nm. Meanwhile, the average particle size of the ferromagnetic powder is preferably equal to or greater than 5 nm, more preferably equal to or greater than 8 nm, even more preferably equal to or greater than 10 nm, still preferably equal to or greater than 15 nm, still more preferably equal to or greater than 20 nm, from a viewpoint of stability of magnetization.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the technology of the disclosure and the specification, the "hexagonal ferrite powder" is ferromagnetic powder in which a hexagonal ferrite type crystal structure is detected as a main phase by X-ray diffraction analysis. The main phase is a structure to which a diffraction peak at the highest intensity in the X-ray diffraction spectrum obtained by the X-ray diffraction analysis is belonged. For example, in a case where the diffraction peak at the highest intensity in the X-ray diffraction spectrum obtained by the X-ray diffraction analysis is belonged to the hexagonal ferrite type crystal structure, it is determined that the hexagonal ferrite type crystal structure is detected as the main phase. In a case where only a single structure is detected by the X-ray diffraction analysis, this detected structure is the main phase. The hexagonal ferrite type crystal structure includes at least an iron atom, a divalent metal atom, and an oxygen atom, as the constituent atom. A divalent metal atom is a metal atom which can be divalent cations as ions, and examples thereof include an alkali earth metal atom such as a strontium atom, a barium atom, or a calcium atom, and a lead atom. In the technology of the disclosure and the specification, the hexagonal strontium ferrite powder is a powder in which main divalent metal atom included in this powder is a strontium atom, and the hexagonal barium ferrite powder is a powder in which the main divalent metal atom included in this powder is a barium atom. The main divalent metal atom is a divalent metal atom occupying the greatest content in the divalent metal atom included in the powder based on atom %. Here, the rare earth atom is not included in the divalent metal atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder according to one aspect of the hexagonal ferrite powder will be described more specifically.

An activation volume of the hexagonal strontium ferrite powder is preferably 800 to 1500 $nm^3$. The atomized hexagonal strontium ferrite powder having the activation volume in the range described above is suitable for manufacturing the magnetic tape MT exhibiting excellent electromagnetic conversion characteristics. The activation volume of the hexagonal strontium ferrite powder is preferably equal to or greater than 800 $nm^3$, and can be, for example, equal to or greater than 850 nm³. In addition, from a viewpoint of further improving electromagnetic conversion characteristics, the activation volume of the hexagonal strontium ferrite powder is more preferably equal to or smaller than 1400 nm³, even more preferably equal to or smaller than 1300 nm³, still preferably equal to or smaller than 1200 nm³, and still more preferably equal to or smaller than 1100 nm³.

The "activation volume" is a unit of magnetization reversal and an index showing a magnetic magnitude of the particles. Regarding the activation volume disclosed in the technology of the disclosure and the specification and an anisotropy constant Ku which will be described later, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant are values acquired from the relational expression of Hc and an activation volume V shown below. A unit of the anisotropy constant Ku is 1 erg/cc=1.0×10⁻¹ J/m³.

$$Hc=2\ Ku/Ms\{1-[(kT/KuV)ln(At/0.693)]^{1/2}\}$$

[In the expression, Ku: anisotropy constant (unit: J/m³), Ms: saturation magnetization (unit: kA/m), k: Boltzmann's constant, T: absolute temperature (unit: K), V: activation volume (unit: cm³), A: spin precession frequency (unit: s⁻¹), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10⁵ J/m³, and more preferably have Ku equal to or greater than 2.0×10⁵ J/m³. In addition, Ku of the hexagonal strontium ferrite powder can be, for example, equal to or smaller than 2.5×10⁵ J/m³. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The "rare earth atom surface layer portion uneven distribution" of the technology of the disclosure and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the technology of the disclosure and the specification means a part of the region of the particles configuring the hexagonal strontium ferrite powder from the inside from the surface.

In a case where the hexagonal strontium ferrite powder includes the rare earth atom, the rare earth atom content (bulk content) is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic tape MT. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the technology of the disclosure and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the technology of the disclosure and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of the magnetic tape MT, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproduction output in a case of reproducing data recorded on the magnetic tape MT, it is desirable that the mass magnetization σs of ferromagnetic powder included in the magnetic tape MT is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the technology of the disclosure and the specification, the mass magnetization σs is a value measured at a magnetic field strength of 1194 kA/m (15 kOe), unless otherwise noted.

Regarding the content (bulk content) of the constituting atom in the hexagonal strontium ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example of the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the technology of the disclosure and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the technology of the disclosure and the specification, the "ε-iron oxide powder" is a ferromagnetic powder having an ε-iron oxide type crystalline structure detected as a main phase by an X-ray diffraction analysis. For example, in a case where the diffraction peak of the highest intensity in the X-ray diffraction spectrum obtained by the X-ray diffraction analysis is belonged to the ε-iron oxide type crystalline structure, it is determined that the ε-iron oxide type crystalline structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. 51, pp. S280-5284, J. Mater. Chem. C, 2013, 1, pp.5200-5206 can be referred to, for example. However, the producing method of the ε-iron oxide powder which can be used as the ferromagnetic powder in the magnetic layer of the magnetic tape MT is not limited to the method described here.

An activation volume of the ε-iron oxide powder is preferably 300 to 1500 nm$^3$. The atomized ε-iron oxide powder showing the activation volume in the range described above is suitable for manufacturing the magnetic tape MT exhibiting excellent electromagnetic conversion characteristics. The activation volume of the ε-iron oxide powder is preferably equal to or greater than 300 nm$^3$, and can be, for example, equal to or greater than 500 nm$^3$. From a viewpoint of further improving electromagnetic conversion characteristics, the activation volume of the ε-iron oxide powder is preferably equal to or smaller than 1400 nm$^3$, more preferably equal to or smaller than 1300 nm$^3$, even more preferably equal to or smaller than 1200 nm$^3$, still preferably equal to or smaller than 1100 nm$^3$.

As an index of the reduction of thermal fluctuation, that is, improvement of thermal stability, the anisotropy constant Ku can be used. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproduction output in a case of reproducing data recorded on the magnetic tape MT, it is desirable that the mass magnetization σs of the ferromagnetic powder included in the magnetic tape MT is high. In regards to this point, in one aspect, the σs of the ε-iron oxide powder can be equal to or greater than 8 A·m²/kg and equal to or greater than 12 A·m²/kg. On the other hand, from a viewpoint of noise reduction, the σs of the ε-iron oxide powder is preferably equal to or smaller than 40 A·m²/kg and more preferably equal to or smaller than 35 A·m²/kg.

In the technology of the disclosure and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the technology of the disclosure and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic tape MT in order to measure the particle size, a method disclosed in a paragraph 0015 of JP2011-048878A can be used, for example.

In the technology of the disclosure and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder in the magnetic layer is preferably 50% to 90% by mass and more preferably 60% to 90% by mass. The magnetic layer includes a ferromagnetic powder, can include a binding agent, and can also include any one or more kinds of additives. A high filling percentage of the ferromagnetic powder in the magnetic layer is preferable from a viewpoint of improvement of recording density.

Binding Agent and Curing Agent

The magnetic tape MT can be a coating type magnetic tape and can include a binding agent in the magnetic layer. The binding agent is one or more kinds of resin. As the binding agent, various resins generally used as the binding agent of the coating type magnetic tape can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-024113A can also be referred to. A content of the binding agent in the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight.

In addition, a curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer formation step. In a case where a composition used for forming other layers includes a curing agent, the same applies to the layer formed by using this composition. The preferred curing agent is a thermosetting compound, polyisocyanate is suitable. For details of the polyisocyanate, descriptions disclosed in paragraphs 0124 and 0125 of JP2011-216149A can be referred to, for example. A content of the curing agent in a magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Additives

The magnetic layer may include one or more kinds of additives, as necessary. As the additives, the curing agent is used as one example. Examples of the additive included in the magnetic layer include a non-magnetic powder, a lubricant, a dispersing agent, a dispersing assistant, an antibacterial agent, an antistatic agent, and an antioxidant. As the lubricant, for example, fatty acid amide which can function as a boundary lubricant can be used. It is considered that the boundary lubricant is a lubricant which can be adsorbed to a surface of powder (for example, ferromagnetic powder) and form a rigid lubricant film to decrease contact friction. Examples of fatty acid amide include amide of various fatty acid such as lauric acid, myristic acid, palmitic acid, stearic acid, oleic acid, linoleic acid, linolenic acid, behenic acid, erucic acid, and elaidic acid, and specific examples thereof include lauric acid amide, myristic acid amide, palmitic acid amide, and stearic acid amide. A content of fatty acid amide in the magnetic layer is, for example, 0 to 3.0 parts by mass, preferably 0 to 2.0 parts by mass, and more preferably 0 to 1.0 parts by mass with respect to 100.0 parts by mass of the ferromagnetic powder. In addition, the fatty acid amide may also be included in the non-magnetic layer. A content of fatty acid amide in the non-magnetic layer is, for example, 0 to 3.0 parts by mass and preferably 0 to 1.0 parts by mass with respect to 100.0 parts by mass of the non-magnetic powder. For the dispersing agent, a description disclosed in paragraphs 0061 and 0071 of JP2012-133837A can be referred to. The dispersing agent may be included in a non-magnetic layer forming composition. For the dispersing agent which may be included in the non-magnetic layer forming composition, a description disclosed in a paragraph 0061 of JP2012-133837A can be referred to. In addition, as the non-magnetic powder which may be included in the magnetic layer, non-magnetic powder which can function as an abrasive, non-magnetic powder which can function as a projection formation agent which forms projections suitably protruded from the surface of the magnetic layer, and the like can be used. Examples of the abrasive include powders of alumina ($Al_2O_3$), silicon carbide, boron carbide ($B_4C$), TiC chromium oxide ($Cr_2O_3$), cerium oxide, zirconium oxide ($ZrO_2$), iron oxide, diamond, and the like which are materials normally used as an abrasive of the magnetic layer, and among these, powder of alumina such as α-alumina, silicon carbide, and diamond are preferable. A content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder. The average particle size of the abrasive is, for example, in a range of 30 to 300 nm and preferably in a range of 50 to 200 nm. As the projection formation agent, carbon black and colloidal particles can be used. A content of the projection formation agent in the magnetic layer is preferably 0.1 to 10.0 parts by mass, more preferably 0.1 to 5.0 parts by mass, and even more preferably 0.5 to 5.0 parts by mass with respect to 100.0 parts by mass of the ferromagnetic powder. An average particle size of the colloidal particles is, for example, preferably in a range of 90 to 200 nm and more preferably in a range of 100 to 150 nm. The average particle size of the carbon black is preferably in a range of 5 to 200 nm and more preferably in a range of 10 to 150 nm.

The magnetic layer described above can be provided on a surface of a non-magnetic support directly or indirectly through a non-magnetic layer.

Non-Magnetic Layer

Next, a non-magnetic layer will be described. The magnetic tape MT may include a magnetic layer directly on the surface of the non-magnetic support or may include a magnetic layer on the surface of the non-magnetic support through the non-magnetic layer including the non-magnetic powder. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be produced by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50% to 90% by mass and more preferably in a range of 60% to 90% by mass.

The non-magnetic layer can be a layer including the non-magnetic powder and the binding agent and can further include one or more kinds of additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the technology of the disclosure and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. 1 [kOe]=$10^6/4\pi$ [A/m]. It is preferable that the non-magnetic layer does not have a residual magnetic flux density and coercivity.

In one aspect, a compound having an ammonium salt structure of alkyl ester anion represented by Formula 1 may be included in the non-magnetic layer. A content of the compound having an ammonium salt structure of alkyl ester anion represented by Formula 1 is preferably equal to or greater than 0.01 parts by mass, more preferably equal to or greater than 0.1 parts by mass, and even more preferably equal to or greater than 0.5 parts by mass with respect to 100.0 parts by mass of the non-magnetic powder in the non-magnetic layer. In addition, the content of the compound in the non-magnetic layer is preferably equal to or smaller than 15.0 parts by mass, more preferably equal to or smaller than 10.0 parts by mass, and even more preferably equal to or smaller than 8.0 parts by mass with respect to 100.0 parts by mass of the non-magnetic powder. The same also applies to a preferred range of the content of the compound in the non-magnetic layer forming composition used for forming the non-magnetic layer. The compound included in the non-magnetic layer can move to the magnetic layer and may further move to the surface of the magnetic layer to form a liquid film. Details of the compound included in the non-magnetic layer or the non-magnetic layer forming composition are as described above.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape MT can also include a back coating layer including a non-magnetic powder on a surface of the non-magnetic support opposite to the surface provided with the magnetic layer. The back coating layer preferably includes any one or both of carbon black and inorganic powder. The back coating layer can be a layer including the non-magnetic powder and the binding agent and can further include one or more additives. In regards to the binding agent of the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of US7029774B can be referred to.

Various Thicknesses

A thickness of the non-magnetic support is, for example, 3.0 to 80.0 μm, preferably 3.0 to 20.0 μm, more preferably 3.0 to 10.0 μm, and even more preferably 3.0 to 6.0 μm.

A thickness of the magnetic layer can be optimized according to a saturation magnetization amount of a magnetic head used, a head gap length, a recording signal band, and the like. The thickness of the magnetic layer is preferably 10 nm to 150 nm, and is more preferably 20 nm to 120 nm, and even more preferably 30 nm to 100 nm from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 3.0 μm, preferably 0.1 to 2.0 μm, and more preferably 0.1 to 1.5 μm.

A thickness of the back coating layer is preferably equal to or smaller than 0.9 μm and even more preferably in a range of 0.1 to 0.7 μm.

The thicknesses of various layers of the magnetic tape MT and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one portion, or an arithmetical mean of thicknesses acquired at a plurality of portions of two or more portions, for example, two portions which are randomly extracted. In addition, the thickness of each layer may be acquired as a designed thickness calculated according to the manufacturing conditions.

The control device 18 controls the entire magnetic tape reading apparatus 10. In the first embodiment according to the technology of the disclosure, the control device 18 is realized with a device including ASIC. Here, the device including the ASIC is used as an example, and the technology of the disclosure is not limited thereto. For example, the control device 18 may be realized with a device including an FPGA or a PLD. In addition, the control device 18 may be realized with a device including a computer including a CPU, a ROM, and a RAM. Further, the control device 18 may be realized with a device of a combination of two or more of ASIC, FPGA, PLD, and the computer.

The transportation device 14 is a device which selectively transports the magnetic tape MT in a forward direction and a backward direction, and includes a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. The rotation rate, the rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension in which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In the first embodiment according to the technology of the present disclosure, the tension of the magnetic tape MT is controlled by controlling the rotation rate, the rotation torque, and the like of the sending motor 20 and the winding motor 24, but the technology of the present disclosure is not limited thereto. For example, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by extending the magnetic tape MT at a plurality of portions (in the example shown in FIG. 1, three portions) between the magnetic tape cartridge 12 and the winding reel 22.

The reading head 16 includes an upstream side reading head 16A and a downstream side reading head 16B. The upstream side reading head 16A and the downstream side reading head 16B are disposed along a running direction of the magnetic tape MT (hereinafter, also simply referred to as a "running direction"). The running direction is a direction corresponding to a forward direction of the magnetic tape MT. The upstream side reading head 16A is disposed on an upstream side of the downstream side reading head 16B in the running direction. That is, the downstream side reading head 16B is disposed on a downstream side of the upstream side reading head 16A in the running direction. The upstream side reading head 16A is held by a holder 28A at a position where data from the magnetic tape MT can be read. The downstream side reading head 16B is held by a holder 28B at a position where data from the magnetic tape MT can be read. In the example shown in FIG. 1, the holder 28A is disposed on the upstream side and the holder 28B is disposed on the downstream side in the running direction with one guide roller GR interposed therebetween.

Figure 2:
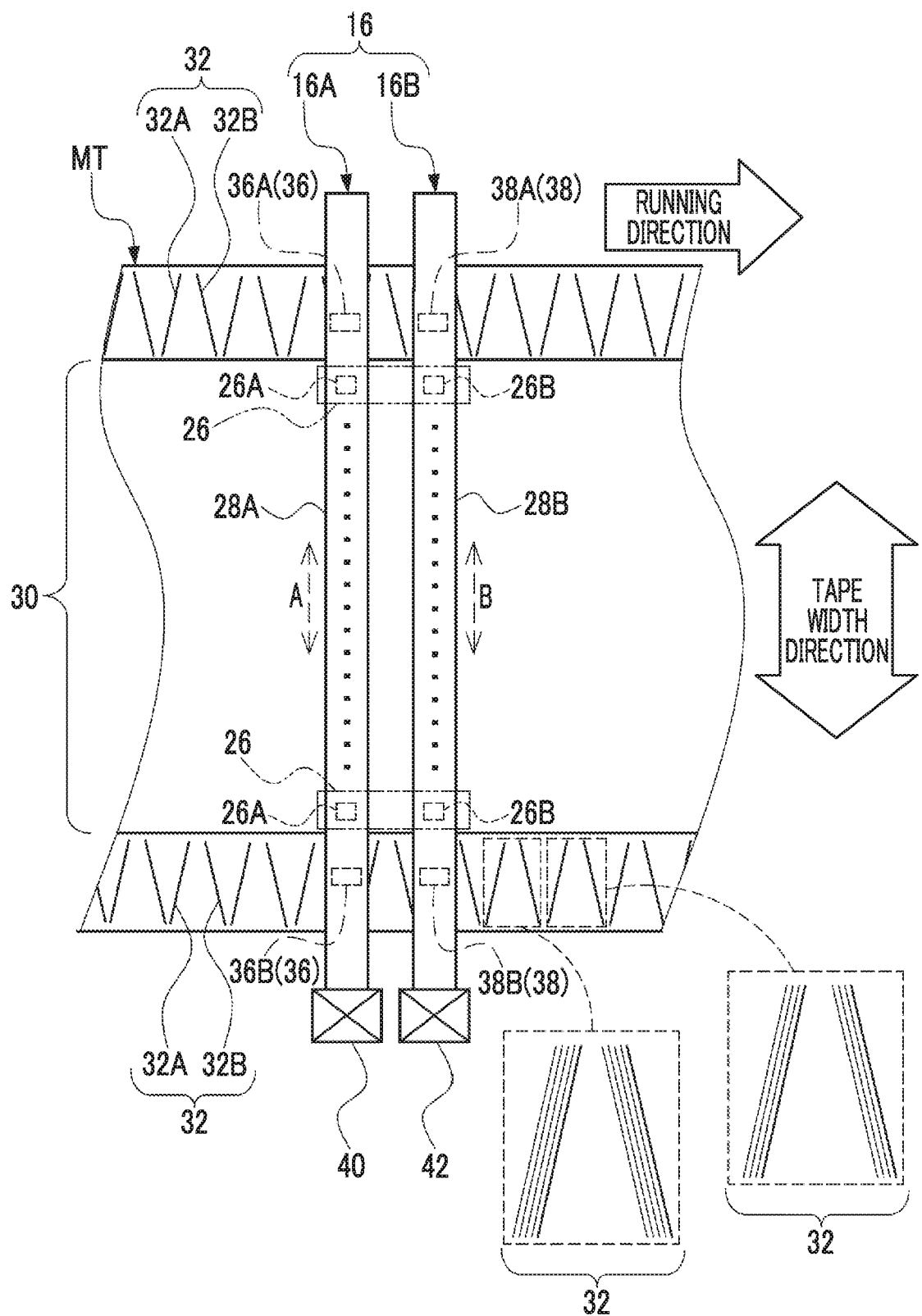
FIG. 2 is a schematic plan view showing an example of a configuration of a plan view of a reading head and a magnetic tape included in a magnetic tape reading apparatus according to the first embodiment.

As an example shown in FIG. 2, the magnetic tape MT includes a track region 30 and a servo pattern 32. The servo pattern 32 is a pattern used for detection of the position of the reading head 16 on the magnetic tape MT. The servo pattern 32 is a pattern in which a plurality of first diagonal lines 32A at a first predetermined angle (for example, 6 degrees) and a plurality of second diagonal lines 32B at a second predetermined angle (for example, 174 degrees) are alternately disposed on both ends in a width direction of the magnetic tape MT (hereinafter, also simply referred to as a "tape width direction") along a running direction of the magnetic tape MT.

Specifically, for example, as shown in enlarged views in FIG. 2, five first diagonal lines 32A and four first diagonal lines 32A are present as the first diagonal lines 32A, and five second diagonal lines 32B and four second diagonal lines 32B are present as the second diagonal lines 32B. That is, the five first diagonal lines 32A, the five second diagonal lines 32B, the four first diagonal lines 32A, and the four second diagonal lines 32B are disposed in this order along the running direction of the magnetic tape MT. The servo pattern 32 in the magnetic tape MT shown in FIG. 2 is simplified, for convenience of description. The first diagonal line 32A shown in the magnetic tape MT shown in FIG. 2 is the first diagonal line 32A on the most downstream side in the running direction among the plurality of first diagonal lines 32A in one servo pattern 32. The second diagonal line 32B shown in the magnetic tape MT shown in FIG. 2 is the second diagonal line 32B on the most downstream side in the running direction among the plurality of second diagonal lines 32B in one servo pattern 32.

The track region 30 is a region where the data which is a reading target is read, and is formed on the center of the magnetic tape MT in the tape width direction. The "center in the tape width direction" here indicates, for example, a region between the servo pattern 32 on one end and the servo pattern 32 on the other end of the magnetic tape MT in the tape width direction.

The upstream side reading head 16A includes an upstream side servo element pair 36. The downstream side reading head 16B includes a downstream side servo element pair 38.

The upstream side servo element pair 36 includes upstream side servo elements 36A and 36B. The upstream side servo element 36A is disposed at a position facing the servo pattern 32 which is an end portion of the magnetic tape MT in the tape width direction, and the upstream side servo element 36B is disposed at a position facing the servo pattern 32 which is the other end portion of the magnetic tape MT in the tape width direction. Here, the upstream side servo elements 36A and 36B are shown as an example, but the technology of the disclosure is satisfied, even in a case of using only any one of the upstream side servo elements 36A and 36B. That is, the number of servo elements necessary for realizing the data reading by the upstream side reading head 16A by a linear scan method may be used with respect to the upstream side reading head 16A.

The downstream side servo element pair 38 includes the downstream side servo elements 38A and 38B. The downstream side servo element 38A is on the downstream side of the upstream side servo element 36A in the running direction and is disposed at a position facing the servo pattern 32 which is an end portion of the magnetic tape MT in the tape width direction. The downstream side servo element 38B is on the downstream side of the upstream side servo element 36B in the running direction and is disposed at a position facing the servo pattern 32 which is the other end portion of the magnetic tape MT in the tape width direction. Here, the downstream side servo elements 38A and 38B are shown as an example, but the technology of the disclosure is satisfied, even in a case of using only any one of the downstream side servo elements 38A and 38B. That is, the number of servo elements necessary for realizing the data reading by the downstream side reading head 16B by a linear scan method may be used with respect to the downstream side reading head 16B.

The reading head 16 includes a plurality of reading units 26. The reading unit 26 is an example of a "reading unit" according to the technology of the disclosure. The plurality of reading units 26 are disposed at positions facing the track region 30, in a default state of the magnetic tape reading apparatus 10.

Here, the default state of the magnetic tape reading apparatus 10 indicates a state where the magnetic tape MT is not deformed and a positional relationship between the magnetic tape MT and the reading head 16 is in a correct positional relationship. Here, the correct positional relationship indicates, for example, a positional relationship in which the center of the track region 30 in the tape width direction and the center of the reading head 16 in a longitudinal direction coincide with each other. The term "coincide" in the first embodiment according to the technology of the disclosure also includes the meaning of substantial coinciding including errors allowed in the designing and manufacturing, in addition to the complete coinciding.

The track region 30 includes a plurality of tracks and the plurality of tracks are disposed in the tape width direction at regular intervals. The number of tracks is, for example, plural times to several tens times of the number of reading units 26. The reading units 26 are, for example, disposed in the tape width direction at regular intervals for each of the number or several number of tracks along the tape width direction. In the first embodiment according to the technology of the disclosure, 32 reading units 26 are used.

That is, the reading units 26 are disposed at positions respectively corresponding to 32 tracks included in the magnetic tape MT. That is, the reading units 26 are disposed at positions corresponding to each single track of the 32 tracks included in the magnetic tape MT. Here, each number of tracks and the reading units 26 is described as 32, but this is merely an example, and the number thereof may be more than or less than 32. The expression "regular interval" in the first embodiment according to the technology of the disclosure also includes the meaning of approximately regular interval including errors allowed in the designing and manufacturing, in addition to the complete regular interval.

The reading unit 26 indicates the upstream side reading element 26A and the downstream side reading element 26B. The upstream side reading element 26A and the downstream side reading element 26B are an example of a "plurality of reading elements" according to the technology of the disclosure. The upstream side reading element 26A is provided on the upstream side reading head 16A and the downstream side reading element 26B is provided on the downstream side reading head 16B.

An upstream side movement mechanism 40 is provided on an end portion of the upstream side reading head 16A. The upstream side movement mechanism 40 moves the upstream side reading head 16A in the tape width direction in accordance with a power applied from the outside. Specifically, the upstream side movement mechanism 40 selectively moves the upstream side reading head 16A to one side and the other side in the tape width direction in accordance with a power applied from the outside. In the example shown in FIG. 2, the one side and the other side in the tape width direction are shown as an arrow A direction.

A downstream side movement mechanism 42 is provided on an end portion of the downstream side reading head 16B. The downstream side movement mechanism 42 moves the downstream side reading head 16B in the tape width direction in accordance with a power applied from the outside. Specifically, the downstream side movement mechanism 42 selectively moves the downstream side reading head 16B to one side and the other side in the tape width direction in accordance with a power applied from the outside. In the example shown in FIG. 2, the one side and the other side in the tape width direction are shown as an arrow B direction.

The upstream side movement mechanism 40 and the downstream side movement mechanism 42 are an example of a "second movement mechanism" according to the technology of the disclosure.

Figure 3:
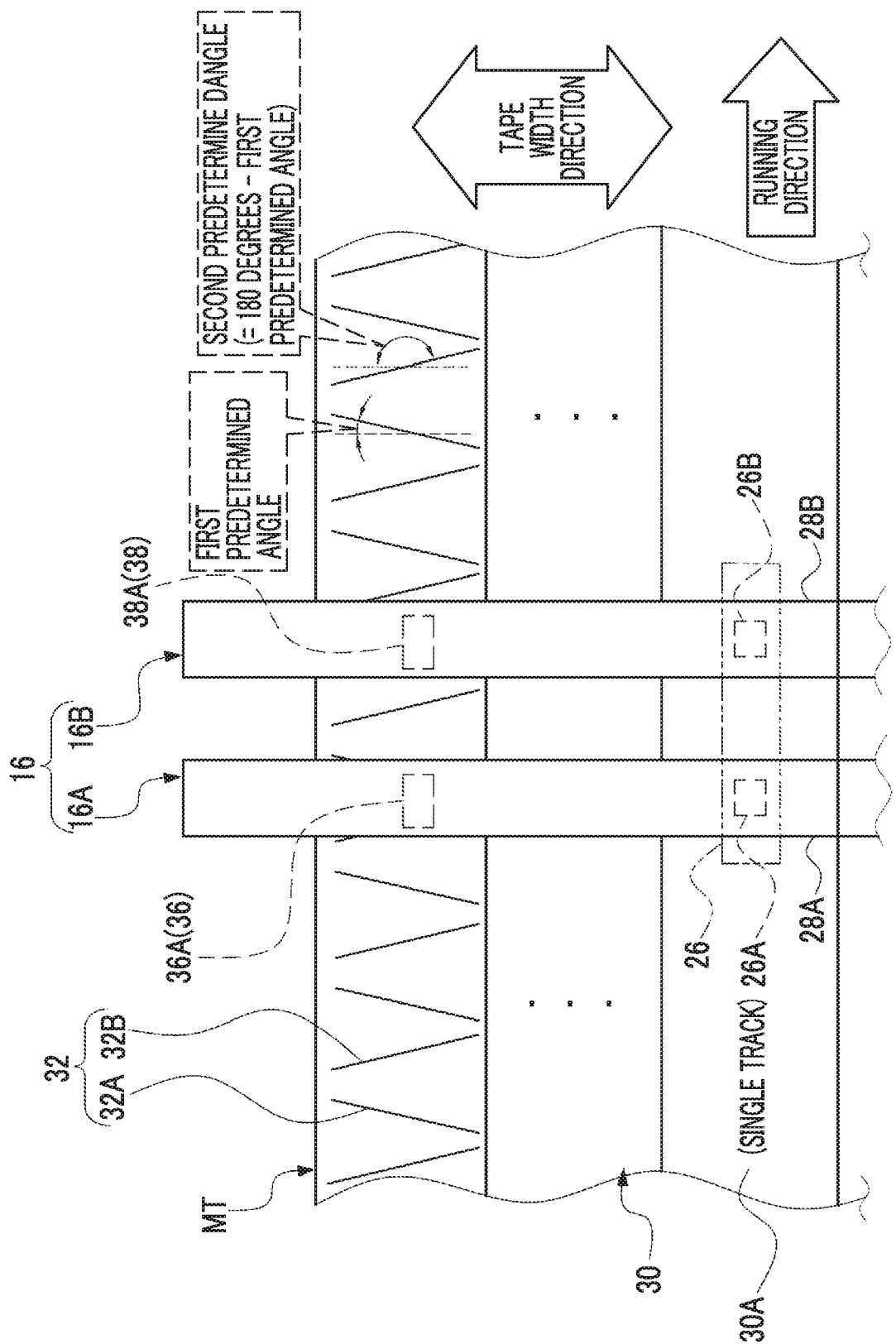
FIG. 3 is a schematic plan view showing an example of a configuration of a plan view of the reading unit of a reading head and the magnetic tape included in the magnetic tape reading apparatus according to the first embodiment.

As shown in FIG. 3 as an example, the upstream side reading element 26A and the downstream side reading element 26B are disposed on single track 30A to which the reading unit 26 is assigned among the plurality of tracks 30A included in the track region 30, in the running direction. The single track 30A to which the reading unit 26 is assigned among the plurality of tracks 30A included in the track region 30 is an example of a "single track" according to the technology of the disclosure. Hereinafter, for convenience of description, the single track 30A to which one reading unit 26 is assigned among the plurality of tracks 30A included in the track region 30 is also referred to as a "single track 30A".

In the first embodiment according to the technology of the disclosure, in a state where the magnetic tape MT runs under the control of the control device 18 (see FIG. 1), the reading of data is performed by the reading head 16 from a specific range of the single track 30A in the running direction of the magnetic tape MT by the linear scan method. Specifically, while the magnetic tape MT runs in one direction one time, the reading of data is performed plural times by the reading head 16 from a specific range of the single track 30A in the running direction of the magnetic tape MT by the linear scan method. The reading of data performed plural times means that the reading of data is performed with respect to the same reading target at different times. In the first embodiment according to the technology of the disclosure, the reading of data is performed with respect to the same reading target twice. "Twice" is merely an example, and the technology of the disclosure satisfies even in a case where the reading of data is performed three or more times.

Hereinafter, for convenience of description, the specific range of the single track 30A in the running direction of the magnetic tape MT is simply referred to as a "specific range". In the first embodiment according to the technology of the disclosure, as the "specific range", a range of a part designated by a user among the range in the running direction of the magnetic tape MT is used. The range of a part referred as the "specific range" is merely an example, and the entire range in the running direction of the magnetic tape MT may be the "specific range".

In a state where the magnetic tape MT runs under the control of the control device 18 (see FIG. 1), each of the upstream side reading element 26A and the downstream side reading element 26B reads data from the specific range by a linear scan method. This means that one device which is the reading unit 26 reads from the specific range twice by a linear scan method under the control of the control device 18. That is, the control device 18 causes the reading unit 26 to read data from the single track 30A plural times, by causing each of the upstream side reading element 26A and the downstream side reading element 26B to read data from the specific range.

In the linear scan method, the servo pattern 32 is read by the upstream side servo element pair 36 and the downstream side servo element pair 38 in synchronous with the reading operation of the reading unit 26. That is, in the linear scan method according to the first embodiment according to the technology of the disclosure, the reading with respect to the magnetic tape MT is performed in parallel by the reading unit 26, the upstream side servo element pair 36, and the downstream side servo element pair 38.

Figure 4:
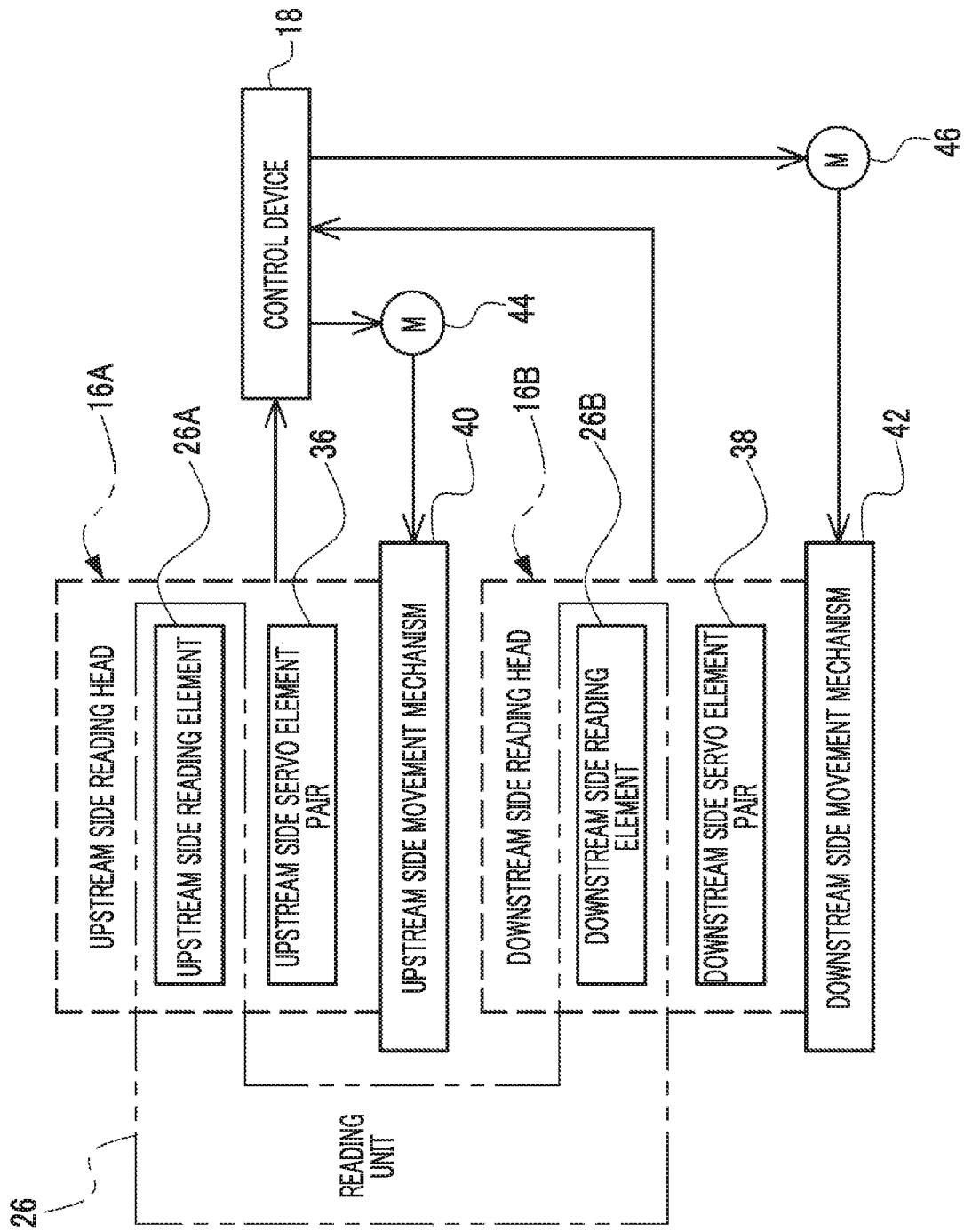
FIG. 4 is a block diagram showing an example of a mutual relationship of an upstream side reading head, a downstream side reading head, an upstream side movement mechanism, a downstream side movement mechanism, a motor, and a control device included in the magnetic tape reading apparatus according to the first embodiment.

As shown in FIG. 4 as an example, each of the upstream side reading head 16A and the downstream side reading head 16B is connected to the control device 18. A reproducing signal obtained from the single track 30A by the reading unit 26 is output to the control device 18. In addition, an analog servo signal obtained by reading of the servo pattern 32 (hereinafter, referred to as an "analog servo signal") by the upstream side servo element pair 36 and the downstream side servo element pair 38 is output to the control device 18.

Motors 44 and 46 are connected to the control device 18. As an example of the motors 44 and 46, a voice coil motor is used. The voice coil motor generates power by converting electric energy based on a current flowing through a coil into kinetic energy, using energy of magnet as a medium. The motor 44 is connected to the upstream side movement mechanism 40 and the motor 46 is connected to the downstream side movement mechanism 42. The upstream side movement mechanism 40 moves the upstream side reading head 16A in the tape width direction by receiving the power from the motor 44, under the control of the control device 18. The downstream side movement mechanism 42 moves the downstream side reading head 16B in the tape width direction by receiving the power from the motor 46, under the control of the control device 18.

Here, the voice coil motor is used as an example of the motors 44 and 46, but the technology of the disclosure is not limited thereto, and for example, a motor which is different type from the voice coil motor may be used. In addition, instead of the motors, a piezoelectric element and/or a solenoid may be used. In addition, the power applied to the upstream side reading head 16A and/or the downstream side reading head 16B may be a power generated by a device obtained by combining a plurality of elements of the motors, the piezoelectric element, and the solenoid.

Figure 5:
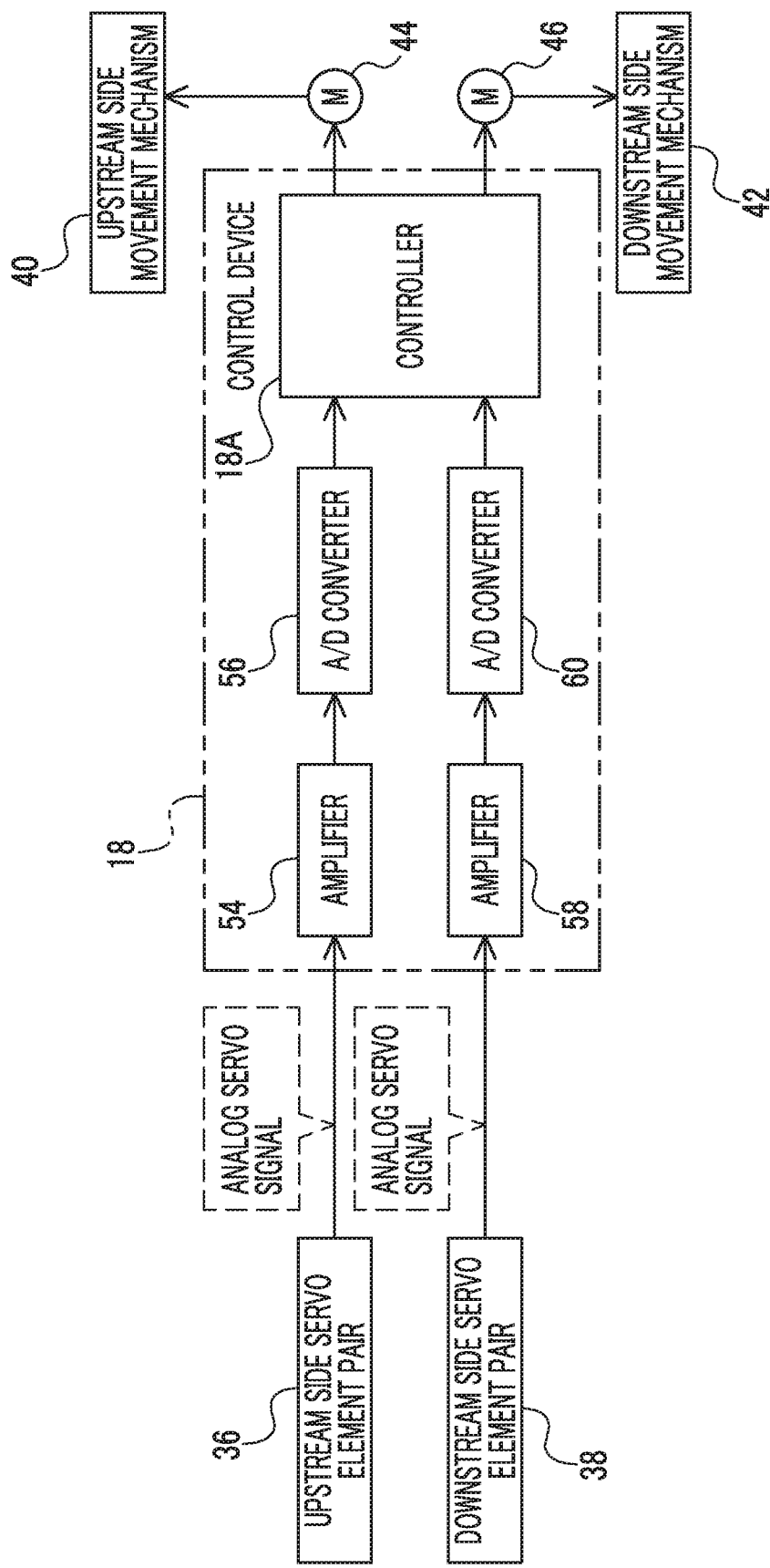
FIG. 5 is a block diagram showing an example of a mutual relationship of an upstream side servo element pair, a downstream side servo element pair, a control device, an upstream side movement mechanism, a downstream side movement mechanism, and a motor included in the magnetic tape reading apparatus according to the first embodiment.

As shown in FIG. 5 as an example, the control device 18 includes a controller 18A, amplifiers 54 and 58, and A/D converters 56 and 60. The upstream side servo element pair 36 is connected to the controller 18A through the amplifier 54 and the A/D converter 56. The controller 18A is connected to the motor 44.

The analog servo signal is input to the amplifier 54 from the upstream side servo element pair 36, the input analog servo signal is amplified, and the amplified analog servo signal is output to the A/D converter 56. The A/D converter 56 converts the analog servo signal input from the amplifier 54 into a digital signal. The digital signal obtained by the A/D converter 56 is output to the controller 18A by the A/D converter 56 as a servo signal (hereinafter, referred to as an "upstream side servo signal").

A deviation amount of position of the single track 30A (see FIG. 3) and the upstream side reading element 26A (see FIG. 3) (hereinafter, referred to as an "upstream side deviation amount") is determined in accordance with the upstream side servo signal which is a result obtained by reading of the servo pattern 32 by the upstream side servo element pair 36.

The deviation of the position of the single track 30A and the upstream side reading element 26A, for example, indicates a deviation of the center of the single track 30A in the tape width direction and the center of the upstream side reading element 26A in the tape width direction.

The controller 18A controls the motor 44 to apply the power according to the upstream side deviation amount to the upstream side movement mechanism 40. The upstream side movement mechanism 40 changes the position of the upstream side reading head 16A in the tape width direction according to the power applied from the motor 44 to adjust the position of the upstream side reading head 16A to a proper position. Here, the "proper position" of the upstream side reading head 16A, for example, indicates a position where the deviation of the center of the single track 30A in the tape width direction and the center of the upstream side reading element 26A in the tape width direction is "0".

The upstream side deviation amount is, for example, calculated based on a ratio of a second distance to a first distance. The second distance, for example, indicates a distance calculated from a result obtained by reading the first diagonal line 32A on the most downstream side (see FIGS. 2 and 3) and the second diagonal line 32B on the most downstream side (see FIGS. 2 and 3) in one servo pattern 32 by the upstream side servo element 36A. The first distance, for example, indicates a distance calculated from a result obtained by reading the second diagonal line 32B on the most downstream side in one servo pattern 32 among the adjacent servo patterns 32 and the second diagonal line 32B on the most downstream side in the other servo pattern 32 by the upstream side servo element 36A.

Specifically, for example, the upstream side deviation amount is calculated by Expression (1). As an "angle α of a diagonal line" of Expression (1), the first predetermined angle and the second predetermined angle are applied. The first predetermined angle is an angle of the first diagonal line 32A formed with a linear line along the tape width direction, and the second predetermined angle is an angle of the second diagonal line 32B formed with a linear line along the tape width direction. That is, the first predetermined angle of the first diagonal line 32A formed with a linear line along the tape width direction clockwise in a front view in the drawing, and the second predetermined angle is obtained by "180 degrees—first predetermined angle".

$$\hat{y} = \frac{d}{2\tan(\alpha)} \left( \frac{1}{2} - \frac{\sum A_i}{\sum B_i} \right) \quad (1)$$

$\hat{y}$: upstream side deviation amount
d: pitch width of servo pattern 32 in running direction
α: angle of diagonal line
$A_i$: second distance
$B_i$: first distance The downstream side servo element pair 38 is connected to the controller 18A through the amplifier 58 and the A/D converter 60. The controller 18A is connected to the motor 46.

The analog servo signal is input to the amplifier 58 from the downstream side servo element pair 38, the input analog servo signal is amplified, and the amplified analog servo signal is output to the A/D converter 60. The A/D converter 60 converts the analog servo signal input from the amplifier 58 into a digital signal. The digital signal obtained by the A/D converter 60 is output to the controller 18A by the A/D converter 60 as a servo signal (hereinafter, referred to as a "downstream side servo signal").

A deviation amount of position of the single track 30A (see FIG. 3) and the downstream side reading element 26B (see FIG. 3) (hereinafter, referred to as a "downstream side deviation amount") is determined in accordance with the downstream side servo signal which is a result obtained by reading of the servo pattern 32 by the downstream side servo element pair 38.

The deviation of the position of the single track 30A and the downstream side reading element 26B, for example, indicates a deviation of the center of the single track 30A in the tape width direction and the center of the downstream side reading element 26B in the tape width direction.

The controller 18A controls the motor 46 to apply the power according to the downstream side deviation amount to the downstream side movement mechanism 42. The downstream side movement mechanism 42 changes the position of the downstream side reading head 16B in the tape width direction to adjust the position of the downstream side reading head 16B to a proper position by applying the power according to the downstream side deviation amount to the downstream side reading head 16B (see FIGS. 2 to 4). Here, the "proper position" of the downstream side reading head 16B, for example, indicates a position where the deviation of the center of the single track 30A in the tape width direction and the center of the downstream side reading element 26B is "0".

The downstream side deviation amount is, for example, calculated based on a ratio of a fourth distance to a third distance. The fourth distance, for example, indicates a distance calculated from a result obtained by reading the first diagonal line 32A on the most downstream side (see FIGS. 2 and 3) and the second diagonal line 32B on the most downstream side (see FIGS. 2 and 3) in one servo pattern 32 by the downstream side servo element 38A. The third distance, for example, indicates a distance calculated from a result obtained by reading the second diagonal line 32B on the most downstream side in one servo pattern 32 among the adjacent servo patterns 32 and the second diagonal line 32B on the most downstream side in the other servo pattern 32 by the downstream side servo element 38A.

Specifically, the downstream side deviation amount is calculated by using Expression (1), in the same manner as the upstream side deviation amount. In this case, in Expression (1), "ŷ" is the downstream side deviation amount, "d" is a pitch width of the servo pattern 32 in the running direction, "α" is an angle of the diagonal line, "$A_i$" is the fourth distance, and "$B_i$" is the third distance.

Figure 6:
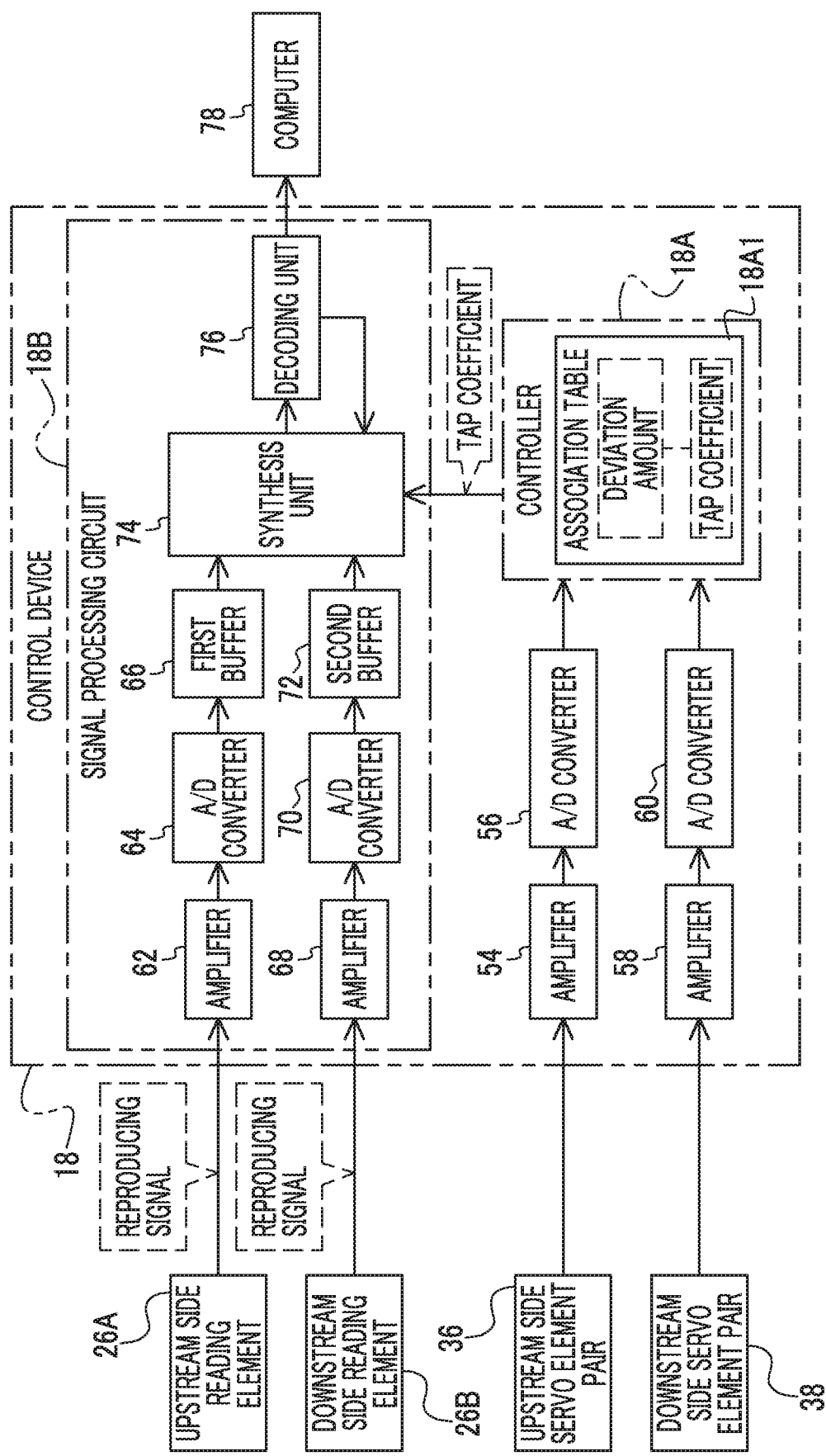
FIG. 6 is a block diagram showing an example of a mutual relationship of an upstream side reading element, a downstream side reading element, an upstream side servo element pair, a downstream side servo element pair, a control device, and a computer included in the magnetic tape reading apparatus according to the first embodiment.

As shown in FIG. 6 as an example, the control device 18 includes a signal processing circuit 18B. The signal processing circuit 18B is an example of a "signal processing unit" of the technology of the disclosure. The signal processing circuit 18B performs a signal processing with respect to an analog reproducing signal which is data read by the upstream side reading element 26A from the single track 30A and an analog reproducing signal of data read by the downstream side reading element 26B from the single track 30A. Hereinafter, for convenience of description, the "analog reproducing signal" is referred to as a "reproducing signal".

The signal processing circuit 18B includes amplifiers 62 and 68, A/D converters 64 and 70, a first buffer 66, a second buffer 72, a synthesis unit 74, and a decoding unit 76. Signal processing performed by the first buffer 66 and the second buffer 72, signal processing performed by the synthesis unit 74, and signal processing performed by the decoding unit 76 are an example of a "signal process" according to the technology of the disclosure.

The upstream side reading element 26A is connected to the synthesis unit 74 through the amplifier 62, the A/D converter 64, and the first buffer 66. The downstream side reading element 26B is connected to the synthesis unit 74 through the amplifier 68, the A/D converter 70, and the second buffer 72. The controller 18A is also connected to the synthesis unit 74. The synthesis unit 74 is connected to the decoding unit 76. A computer 78 is provided outside of the control device 18 and the decoding unit 76 is connected to the computer 78.

The upstream side reading element 26A outputs the reproducing signal which is data read from the single track 30A to the amplifier 62. The amplifier 62 amplifies the input reproducing signal and outputs the amplified reproducing signal to the A/D converter 64. The A/D converter 64 converts the input reproducing signal into a digital signal. The digital signal obtained by the A/D converter 64 is output to the first buffer 66 by the A/D converter 64 as an AD converted upstream side reproducing signal sequence. The AD converted upstream side reproducing signal sequence is temporarily held by the first buffer 66.

The downstream side reading element 26B outputs the reproducing signal which is data read from the single track 30A to the amplifier 68. The amplifier 68 amplifies the input reproducing signal and outputs the amplified reproducing signal to the A/D converter 70. The A/D converter 70 converts the input reproducing signal to a digital signal. The digital signal obtained by the A/D converter 70 is output to the second buffer 72 by the A/D converter 70 as an AD converted downstream side reproducing signal sequence. The AD converted downstream side reproducing signal sequence is temporarily held by the second buffer 72.

In the first embodiment according to the technology of the disclosure, hereinafter, for convenience of description, the AD converted upstream side reproducing signal sequence and the AD converted downstream side reproducing signal sequence are referred to as the "AD converted reproducing signal sequence", in a case where it is not necessary to describe these separately. In the first embodiment according to the technology of the disclosure, hereinafter, for convenience of description, the AD converted reproducing signal sequence, a first phase synchronization processed reproducing signal sequence (which will be described later), a second phase synchronization processed reproducing signal sequence (which will be described later), a first waveform equalization processed reproducing signal sequence (which will be described later), and a second waveform equalization processed reproducing signal sequence (which will be described later) are referred to as the "reproducing signal sequence", in a case where it is not necessary to describe these separately. In the first embodiment according to the technology of the disclosure, hereinafter, for convenience of description, the first phase synchronization processed reproducing signal sequence and the second phase synchronization processed reproducing signal sequence are referred to as the "phase synchronization processed reproducing signal sequence", in a case where it is not necessary to describe these separately. In the first embodiment according to the technology of the disclosure, hereinafter, for convenience of description, the first waveform equalization processed reproducing signal sequence and the second waveform equalization processed reproducing signal sequence are referred to as the "waveform equalization processed reproducing signal sequence", in a case where it is not necessary to describe these separately. In the first embodiment according to the technology of the disclosure, hereinafter, for convenience of description, the AD converted upstream side reproducing signal sequence, the first phase synchronization processed reproducing signal sequence, and the first waveform equalization processed reproducing signal sequence are referred to as the "upstream side reproducing signal sequence", in a case where it is not necessary to describe these separately. In the first embodiment according to the technology of the disclosure, hereinafter, for convenience of description, the AD converted downstream side reproducing signal sequence, the second phase synchronization processed reproducing signal sequence, and the second waveform equalization processed reproducing signal sequence are referred to as the "downstream side reproducing signal sequence", in a case where it is not necessary to describe these separately.

Figure 7:
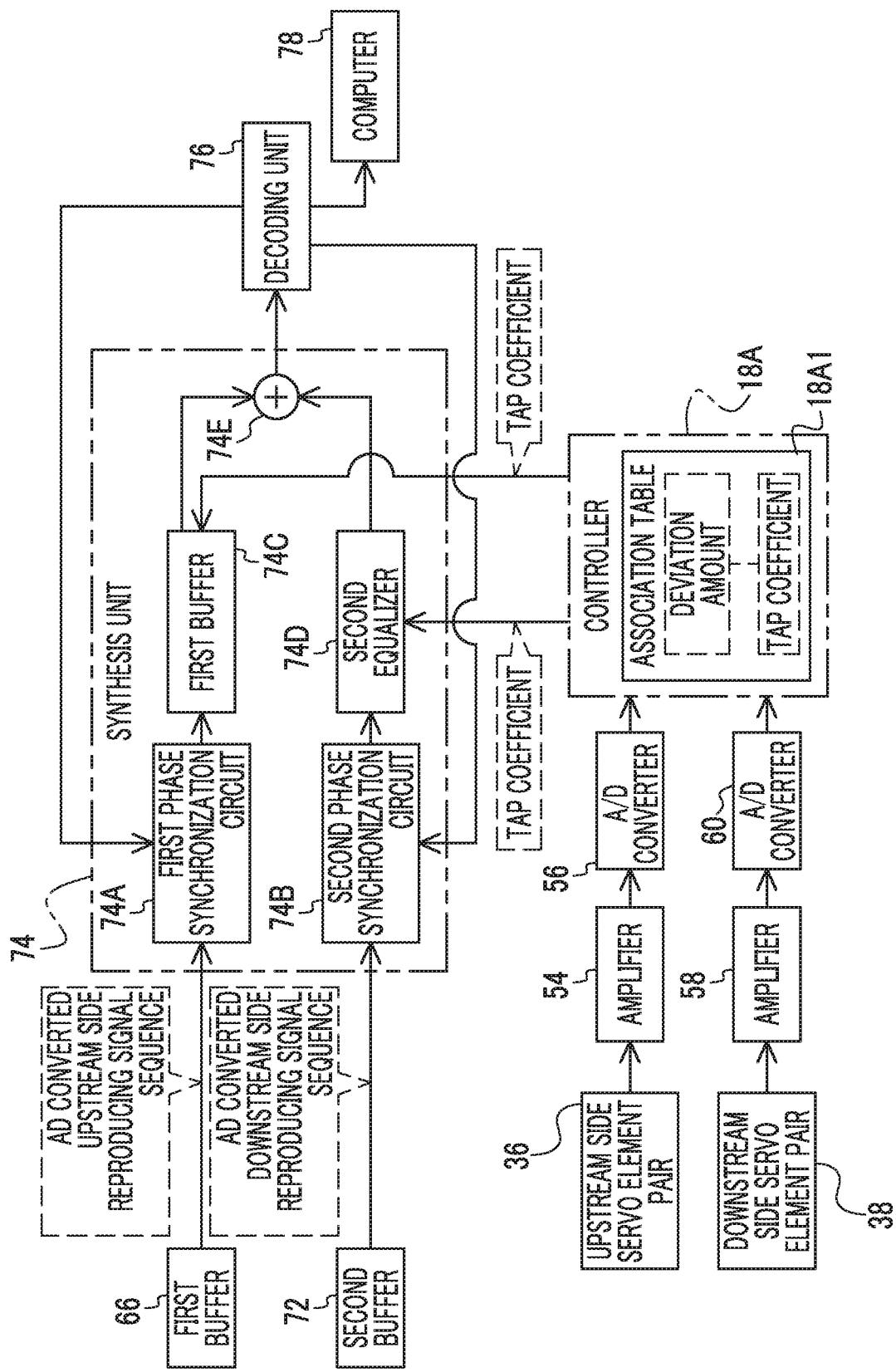
FIG. 7 is a block diagram showing an example of a mutual relationship of a phase synchronization circuit, an upstream side servo element pair, a downstream side servo element pair, an amplifier, an A/D converter, a controller, a synthesis unit, a decoding unit, and a computer included in the magnetic tape reading apparatus according to the first embodiment.

As shown in FIG. 7 as an example, the synthesis unit 74 includes a first phase synchronization circuit 74A, a second phase synchronization circuit 74B, a first equalizer 74C, a second equalizer 74D, and an adder 74E. In the synthesis unit 74, a two-dimensional FIR filter is implemented by the first equalizer 74C, the second equalizer 74D, and the adder 74E. The synthesis unit 74 synthesizes the plurality of reproducing signal sequences obtained by reading data from the specific range by the reading unit 26 plural times. In the first embodiment according to the technology of the disclosure, the synthesis unit 74 synthesizes two reproducing signal sequences obtained by reading of data from the specific range by the reading unit 26 twice, that is, a first waveform equalization processed reproducing signal sequence (which will be described later) and a second waveform equalization processed reproducing signal sequence (which will be described later).

The first buffer 66 is connected to the first equalizer 74C through the first phase synchronization circuit 74A. The second buffer 72 is connected to the second equalizer 74D through the second phase synchronization circuit 74B. The controller 18A is connected to each of the first equalizer 74C and the second equalizer 74D. Each of the first equalizer 74C and the second equalizer 74D is connected to the adder 74E.

However, a deviation in phase in the running direction may occur in the upstream side reproducing signal sequence due to deformation of the magnetic tape MT, sharp vibration applied to the magnetic tape MT and/or the reading head 16, and jitter during running of the magnetic tape MT.

Accordingly, the first phase synchronization circuit 74A obtains the AD converted upstream side reproducing signal sequence from the first buffer 66 and performs a phase synchronization process with respect to the obtained AD converted upstream side reproducing signal sequence. The phase synchronization process by the first phase synchronization circuit 74A indicates a process of suppressing a deviation in phase of the AD converted upstream side reproducing signal sequence in the running direction in an allowable certain error range based on a decoding result obtained by the decoding unit 76.

The decoding result obtained by the decoding unit 76 of the past upstream side reproducing signal sequence (for example, past upstream side reproducing signal sequence by several bits) is fed back to the first phase synchronization circuit 74A. The first phase synchronization circuit 74A specifies a deviation in phase generated in the past from the decoding result fed back, and corrects the specified deviation in phase by causing a delay of several bits to the present. As described above, the first phase synchronization circuit 74A repeats the receiving of feedback and the correction by performing a delay, and accordingly, the deviation in phase is maintained in the allowable certain error range.

Here, the embodiment in which the phase synchronization process using the decoding result of the decoding unit 76 is executed by the first phase synchronization circuit 74A has been used, but the technology of the disclosure is not limited thereto. For example, a process of synchronizing a phase deviated by a slight deviation occurring in the running direction due to sharp vibration and/or jitter applied to the magnetic tape MT and/or the upstream side reading element 26A with a phase of a reference clock predetermined with respect to the control device 18 (hereinafter, simply referred to as a "reference clock") may be performed.

The first equalizer 74C obtains a first phase synchronization processed upstream side reproducing signal sequence obtained by performing the phase synchronization process with respect to the AD converted upstream side reproducing signal sequence by the first phase synchronization circuit 74A, and performs a waveform equalization process with respect to the obtained first phase synchronization processed upstream side reproducing signal sequence. That is, the first equalizer 74C performs a convolution process of a tap coefficient (which will be described later) derived by the controller 18A with respect to the first phase synchronization processed upstream side reproducing signal sequence, and the upstream side reproducing signal sequence after the convolution process is output to the adder 74E.

The first equalizer 74C is a one-dimensional FIR filter. The FIR filter is a sequence of actual numbers including positive and negative values, the number of lines of the sequence is referred to as a tap number, and the actual number is referred to as the tap coefficient. The waveform equalization process performed by the first equalizer 74C indicates a process of performing the convolution operation (product-sum operation) of the sequence of the actual numbers, that is, the tap coefficient, with respect to the first phase synchronization processed upstream side reproducing signal sequence obtained from the first phase synchronization circuit 74A.

Here, the embodiment in which the process by the first equalizer 74C is executed after the process by the first phase synchronization circuit 74A has been used for describing, but the technology of the disclosure is not limited thereto. For example, the process by the first phase synchronization circuit 74A may be performed after the process by the first equalizer 74C. In this case, the first equalizer 74C may obtain the AD converted upstream side reproducing signal sequence from the first buffer 66, perform the waveform equalization process with respect to the obtained AD converted upstream side reproducing signal sequence, and output the first waveform equalization processed upstream side reproducing signal sequence obtained by the upstream side waveform equalization process after the AD conversion to the first phase synchronization circuit 74A. In the first embodiment according to the technology of the disclosure, the upstream side reproducing signal sequence obtained by performing the waveform equalization process with respect to the AD converted upstream side reproducing signal sequence or the first phase synchronization processed upstream side reproducing signal sequence by the first equalizer 74C is simply referred to as a "first waveform equalization processed upstream side reproducing signal sequence".

However, in the same manner as the upstream side reproducing signal sequence, a deviation in phase in the running direction may occur in the downstream side reproducing signal sequence due to deformation of the magnetic tape MT, sharp vibration applied to the magnetic tape MT and/or the reading head 16, and jitter during running of the magnetic tape MT.

Accordingly, the second phase synchronization circuit 74B obtains the AD converted downstream side reproducing signal sequence from the second buffer 72 and performs a phase synchronization process with respect to the obtained AD converted downstream side reproducing signal sequence. The phase synchronization process by the second phase synchronization circuit 74B indicates a process of suppressing a deviation in phase of the AD converted downstream side reproducing signal sequence in the running direction in an allowable certain error range based on a decoding result obtained by the decoding unit 76.

The decoding result obtained by the decoding unit 76 of the past downstream side reproducing signal sequence (for example, past downstream side reproducing signal sequence by several bits) is fed back to the second phase synchronization circuit 74B. The second phase synchronization circuit 74B specifies a deviation in phase generated in the past from the decoding result fed back, and corrects the specified deviation in phase by causing a delay of several bits to the present. As described above, the second phase synchronization circuit 74B repeats the receiving of feedback and the correction by performing a delay, and accordingly, the deviation in phase is maintained in the allowable certain error range.

Here, the embodiment in which the phase synchronization process using the decoding result of the decoding unit 76 is executed by the second phase synchronization circuit 74B has been used, but the technology of the disclosure is not limited thereto. For example, a process of synchronizing a phase deviated by a slight deviation occurring in the running direction due to sharp vibration and/or jitter applied to the magnetic tape MT and/or the downstream side reading element 26B with a phase of a reference clock may be performed.

The second equalizer 74D obtains a second phase synchronization processed downstream side reproducing signal sequence obtained by performing the phase synchronization process with respect to the AD converted downstream side reproducing signal sequence by the second phase synchronization circuit 74B, and performs a waveform equalization process with respect to the obtained second phase synchronization processed downstream side reproducing signal sequence. The second equalizer 74D is a one-dimensional FIR filter, in the same manner as the first equalizer 74C. The waveform equalization process performed by the second equalizer 74D indicates a process of performing the convolution operation of the tap coefficient, with respect to the second phase synchronization processed downstream side reproducing signal sequence obtained from the second phase synchronization circuit 74B. The second equalizer 74D performs the convolution operation of the tap coefficient with respect to the second phase synchronization processed downstream side reproducing signal sequence, by the same method as the first phase synchronization processed upstream side reproducing signal sequence, and outputs the downstream side reproducing signal sequence after the convolution operation to the adder 74E.

Here, the embodiment in which the process by the second equalizer 74D is executed after the process by the second phase synchronization circuit 74B has been used for describing, but the technology of the disclosure is not limited thereto. For example, the process by the second phase synchronization circuit 74B may be performed after the process by the second equalizer 74D. In this case, the second equalizer 74D may obtain the AD converted downstream side reproducing signal sequence from the second buffer 72, perform the waveform equalization process with respect to the obtained AD converted downstream side reproducing signal sequence, and output the second waveform equalization processed downstream side reproducing signal sequence obtained by the waveform equalization process to the second phase synchronization circuit 74B. In the first embodiment according to the technology of the disclosure, the downstream side reproducing signal sequence obtained by performing the waveform equalization process with respect to the AD converted downstream side reproducing signal sequence or the second phase synchronization processed downstream side reproducing signal sequence by the second equalizer 74D is simply referred to as a "second waveform equalization processed upstream side reproducing signal sequence".

The controller 18A holds an association table 18A1. In the association table 18A1, the deviation amount and the tap coefficient used in the first equalizer 74C and the second equalizer 74D are associated with each other. The deviation amount is divided into an upstream side deviation amount and a downstream side deviation amount. That is, in the association table 18A1, the upstream side deviation amount and the tap coefficient used in the first equalizer 74C are associated with each other, and the downstream side deviation amount and the tap coefficient used in the second equalizer 74D are associated with each other. Weights different from each other are applied to the tap coefficient used in the first equalizer 74C and the tap coefficient used in the second equalizer 74D. The weight may be a fixed value, and may be a variable value which changes in accordance an instruction applied from a user or the like through an input device (not shown in the drawing) with respect to the magnetic tape reading apparatus 10. The tap coefficient used in the first equalizer 74C and the tap coefficient used in the second equalizer 74D are an example of "parameter used in the two-dimensional FIR filter" according to the technology of the disclosure. Hereinafter, for convenience of description, the upstream side deviation amount and the downstream side deviation amount are simply referred to as the "deviation amount", in a case where it is not necessary to describe these separately.

A combination of the deviation amount and the tap coefficient of the association table 18A1 is, for example, a combination obtained in advance as a combination of a deviation amount and a tap coefficient, from which the best synthesis data is obtained by the adder 74E (which will be described later), based on a test performed with a real machine and/or a result of a simulation.

The "beset synthesis data" here indicates, for example, synthesis data having a signal-to-noise ratio (SNR) equal to or greater than a predetermined value (for example, predetermined value as a maximum value assumed in advance), that is, synthesis data having suppressed noise in an allowable range. The generation of the synthesis data having an SNR equal to or greater than a predetermined value is, for example, realized by calculating a combination of tap coefficient, from which an SNR equal to or greater than a predetermined value is obtained, among the combinations of the tap coefficient, and using the calculated combination of the tap coefficient. As a method calculating the combination of the tap coefficient, from which an SNR equal to or greater than a predetermined value is obtained, for example, a method of solving Wiener-Hopfs integral equation is used.

As another method of determining the combination of the tap coefficient, from which an SNR equal to or greater than a predetermined value is obtained, a method of performing the determination using an adaptive filter is considered. In this case, a difference between teacher data and a real time reproducing signal sequence is defined as an error, and a feedback of correcting the tap coefficient of FIR is performed with respect to the adaptive filter so as to reduce the defined error. The tap coefficient of the adaptive filter is converged to an optimal value by feeding back the error with respect to the adaptive filter as described above, and accordingly, the obtained tap coefficient is used as the tap coefficient of the association table 18A1. The "optimal value" here, for example, indicates a value in an allowable error range. The "teacher data" here, for example, indicates an ideal signal predetermined as an ideal reproducing signal sequence by a test performed with a real machine and/or a computer simulation. In addition, the "real time reproducing signal sequence" here indicates a waveform equalized reproducing signal sequence obtained by the magnetic tape reading apparatus 10 in real time.

Here, the association table 18A1 has described, but the technology of the disclosure is not limited thereto, and an operational expression may be used instead of the association table 18A1. The "operational expression" here, for example, indicates an operational expression using an independent variable as a deviation amount and a dependent variable as a tap coefficient.

The controller 18A derives the upstream side deviation amount based on the upstream side servo signal input from the A/D converter 56 and obtains a tap coefficient corresponding to the derived upstream side deviation amount from the association table 18A1. That is, the tap coefficient used in the first equalizer 74C is determined in accordance with the upstream side deviation amount. The controller 18A outputs the tap coefficient corresponding to the upstream side deviation amount to the first equalizer 74C. The first equalizer 74C performs the waveform equalization process with respect to the first phase synchronization processed reproducing signal sequence using the tap coefficient input from the controller 18A.

The controller 18A derives the downstream side deviation amount based on the downstream side servo signal input from the A/D converter 60 and obtains a tap coefficient corresponding to the derived downstream side deviation amount from the association table 18A1. That is, the tap coefficient used in the second equalizer 74D is determined in accordance with the downstream side deviation amount. The controller 18A outputs the tap coefficient corresponding to the downstream side deviation amount to the second equalizer 74D. The second equalizer 74D performs the waveform equalization process with respect to the second phase synchronization processed reproducing signal sequence using the tap coefficient input from the controller 18A.

The adder 74E performed synthesis by adding the first waveform equalization processed reproducing signal sequence input from the first equalizer 74C and the second waveform equalization processed reproducing signal sequence input from the second equalizer 74D and outputs synthesis data obtained by the synthesis to the decoding unit 76. Here, the first waveform equalization processed reproducing signal sequence and the second waveform equalization processed reproducing signal sequence are simply added up by the adder 74E. Accordingly, the tap coefficient used by the one-dimensional FIR filter in each of the first equalizer 74C and the second equalizer 74D is adjusted and determined by assuming that the first waveform equalization processed reproducing signal sequence and the second waveform equalization processed reproducing signal sequence are simply added up by the adder 74E. Here, the simple adding performed by the adder 74E has been described, but the technology of the disclosure is not limited thereto, and for example, the first waveform equalization processed reproducing signal sequence and the second waveform equalization processed reproducing signal sequence may be added and averaged. Even in this case, the tap coefficient used by the one-dimensional FIR filter in each of the first equalizer 74C and the second equalizer 74D may be adjusted and determined by assuming the adding and averaging performed by the adder 74E.

As described above, in the synthesis unit 74, the waveform equalization process by the two-dimensional FIR filter is performed with respect to the first waveform equalization processed reproducing signal sequence and the second waveform equalization processed reproducing signal sequence, and synthesis data obtained by performing the waveform equalization process is output to the decoding unit 76.

The decoding unit 76 decodes the synthesis data input from the adder 74E and outputs a decoded signal obtained by decoding to the computer 78. The computer 78 executes various processes with respect to the decoded signal input from the decoding unit 76.

Figure 8:
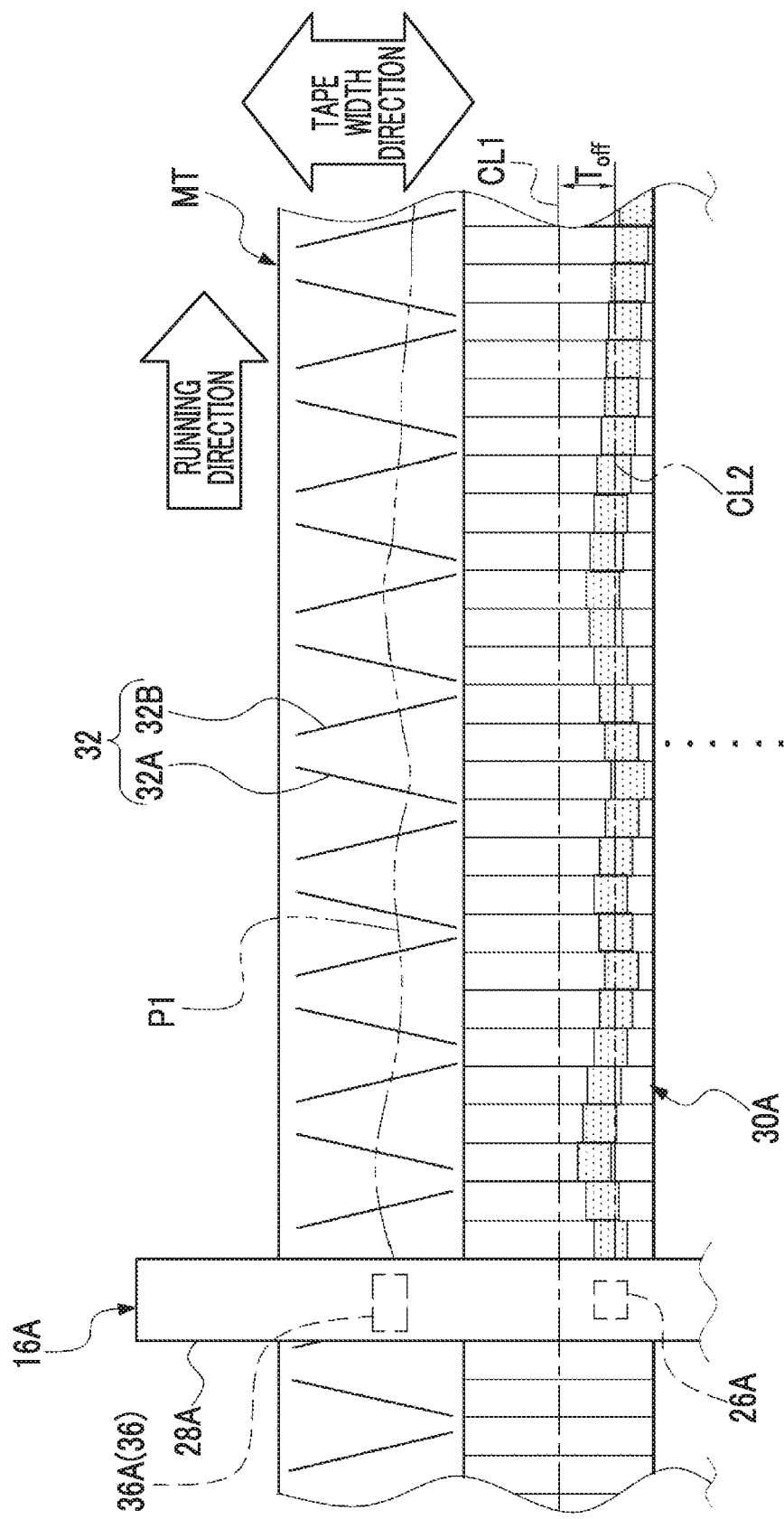
FIG. 8 is a plan view conceptual view showing a relationship between a reading path of the upstream side reading element and a center of a single track included in the magnetic tape reading apparatus according to the first embodiment.

As shown in FIG. 8 as an example, the upstream side reading element 26A is disposed at a position not dropped off from the single track 30A. That is, the upstream side reading element 26A is disposed so as to fall in the width of the single track 30A. A size of the upstream side reading element 26A is a size to fit in the single track 30A. In the example shown in FIG. 8, the width of the upstream side reading element 26A (length in the tape width direction) is approximately ⅕ of the width of the single track 30A. The width of the upstream side reading element 26A may be ⅕ to less than 1 of the width of the single track 30A. The same relationship as the relationship between the upstream side reading element 26A and the single track 30A is applied to the relationship between the downstream side reading element 26B and the single track 30A.

However, as shown in FIG. 8 as an example, a reading path P1 of the upstream side servo element 36A meanders due to vibration applied to the magnetic tape MT and/or the reading head 16 from the outside and/or deformation of the magnetic tape MT (hereinafter, referred to as "environmental conditions"). Accordingly, the reading path of data from the single track 30A by the upstream side reading element 26A (hereinafter, also referred to as an "upstream side reading element path") also meanders. The inventors have compared an SNR of one time reading and an SNR of two times of reading for each deviation amount (track offset) $T_{off}$ between a center CL1 of the single track 30A in the tape width direction and an average position CL2 of the upstream side reading element path, under the condition in which the width of the single track 30A is 1.0 μm. The "SNR of one time reading" here, for example, indicates an SNR of the first waveform equalization processed reproducing signal sequence subjected to the waveform equalization process by the first equalizer 74C, and the SNR of the second times of reading, for example, indicates an SNR of the synthesis data obtained from the adder 74E.

The SNR of one time reading and the SNR of two times of reading are compared to each other as described above, and the inventors have confirmed that the SNR of the two times of reading is greater than the SNR of one time reading by approximately 2.5 dB (decibels) at most. In addition, the inventors have confirmed that, in a case where the absolute value of the track offset is great, that is, a rapid decrease of SNR occurring in an end portion of the single track 30A is also alleviated in a case of the SNR of the two times of reading, compared to the SNR of one time reading. The inventors have also confirmed that the same result as described above is obtained, even in a case where the width of the single track 30A is 0.5 μm or the like.

Figure 9:
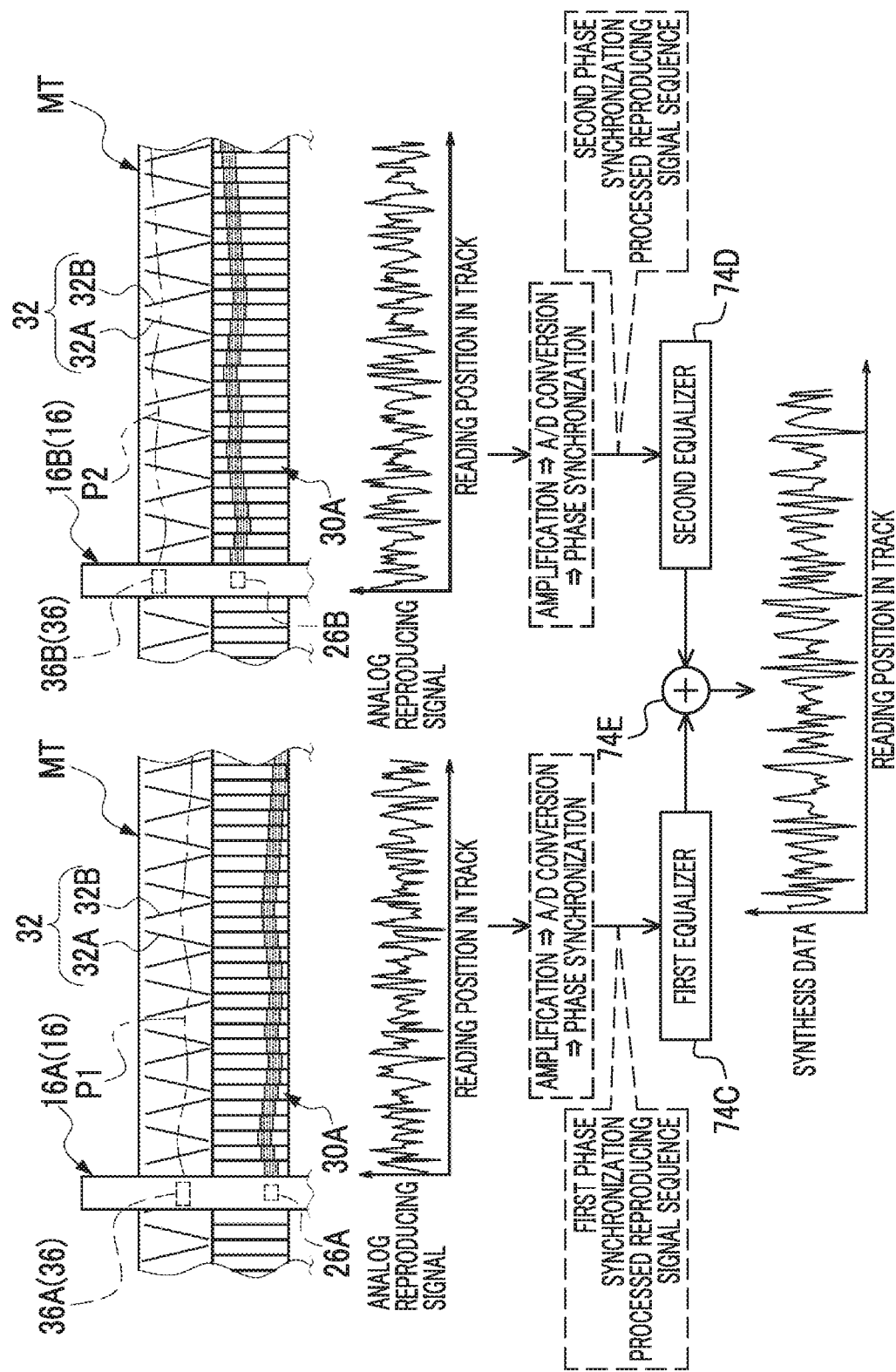
FIG. 9 is a conceptual view showing an example of a flow of a process till each reproducing signal sequence obtained by reading data by each of the upstream side reading element and the downstream side reading element included in the magnetic tape reading apparatus according to the first embodiment is synthesized.

One reason for that the SNR of two times of reading is better than the SNR of one time reading as described above is that the reading path of data in the range of the single track 30A in the width direction is different between the upstream side reading element 26A and the downstream side reading element 26B, as shown in FIG. 9 as an example.

Even in the example shown in FIG. 9, in the same manner as the upstream side servo element 36A, a reading path P2 of the downstream side servo element 36B meanders due to the environmental condition. Accordingly, the reading path of data from the single track 30A by the downstream side reading element 26B (hereinafter, also referred to as a "downstream side reading element path") also meanders. The environmental condition in a case where the reading of data is performed by the upstream side reading element 26A and the environmental condition in a case where the reading of data is performed by the downstream side reading element 26B in the specific range are different from each other. Accordingly, the upstream side reading element path and the downstream side reading element path are different from each other. That is, the upstream side reading element path and the downstream side reading element path are reading paths different from each other due to the environmental condition.

The upstream side reading element path and the downstream side reading element path different from each other means that the reading of data is performed in a wide range of the single track 30A in the width direction, compared to a case where the reading of data is performed by the upstream side reading element 26A or the downstream side reading element 26B. In addition, in general, it is known that quality of reproducing signals varies due to non-uniformity of a magnetic material and/or non-uniformity of a surface shape of the single track 30A in the width direction.

However, even in a case where the reading of data is insufficient by any one of the upstream side reading element 26A and the downstream side reading element 26B, the insufficiency can be compensated by the other one, by performing the reading of data by the reading unit 26.

The "quality of the reproducing signals" described above is, for example, determined in accordance with a size of an amplitude of the reproducing signal and/or a ratio of noise (for example, high-frequency noise) to the reproducing signal. Here, the high-quality reproducing signal, for example, indicates a reproducing signal in which the size of amplitude is in an error range allowable in the designing and producing and unallowable noise in the designing and producing is not superimposed. In contrast, a low-quality reproducing signal, for example, indicates a reproducing signal in which the size of amplitude is beyond an error range allowable in the designing and producing and unallowable noise in the designing and producing is superimposed. The standard of quality described here is merely an example and it is needless to say that various standards of quality may be used.

As shown in FIG. 9 as an example, the reproducing signal read in the upstream side reading element path is amplified and A/D-converted. The phase synchronization process is performed with respect to the AD converted upstream side reproducing signal sequence obtained as described above. The first phase synchronization processed reproducing signal sequence subjected to the phase synchronization process is output to the first equalizer 74C. In the first equalizer 74C, the waveform equalization process is performed with respect to the input first phase synchronization processed reproducing signal sequence by the one-dimensional FIR filter.

Meanwhile, the reproducing signal read in the downstream side reading element path is also amplified and A/D-converted. The phase synchronization process is performed with respect to the AD converted downstream side reproducing signal sequence obtained as described above. The second phase synchronization processed reproducing signal sequence subjected to the phase synchronization process is output to the second equalizer 74D. In the second equalizer 74D, the waveform equalization process is performed with respect to the input second phase synchronization processed reproducing signal sequence by the one-dimensional FIR filter.

The adder 74E generates the synthesis data by adding the first phase synchronization processed reproducing signal sequence subjected to the waveform equalization process by the first equalizer 74C and the second phase synchronization processed reproducing signal sequence subjected to the waveform equalization process by the second equalizer 74D.

Next, the operation of the magnetic tape reading apparatus 10 which is a part according to the technology of the disclosure will be described with reference to FIG. 10.

Figure 10:
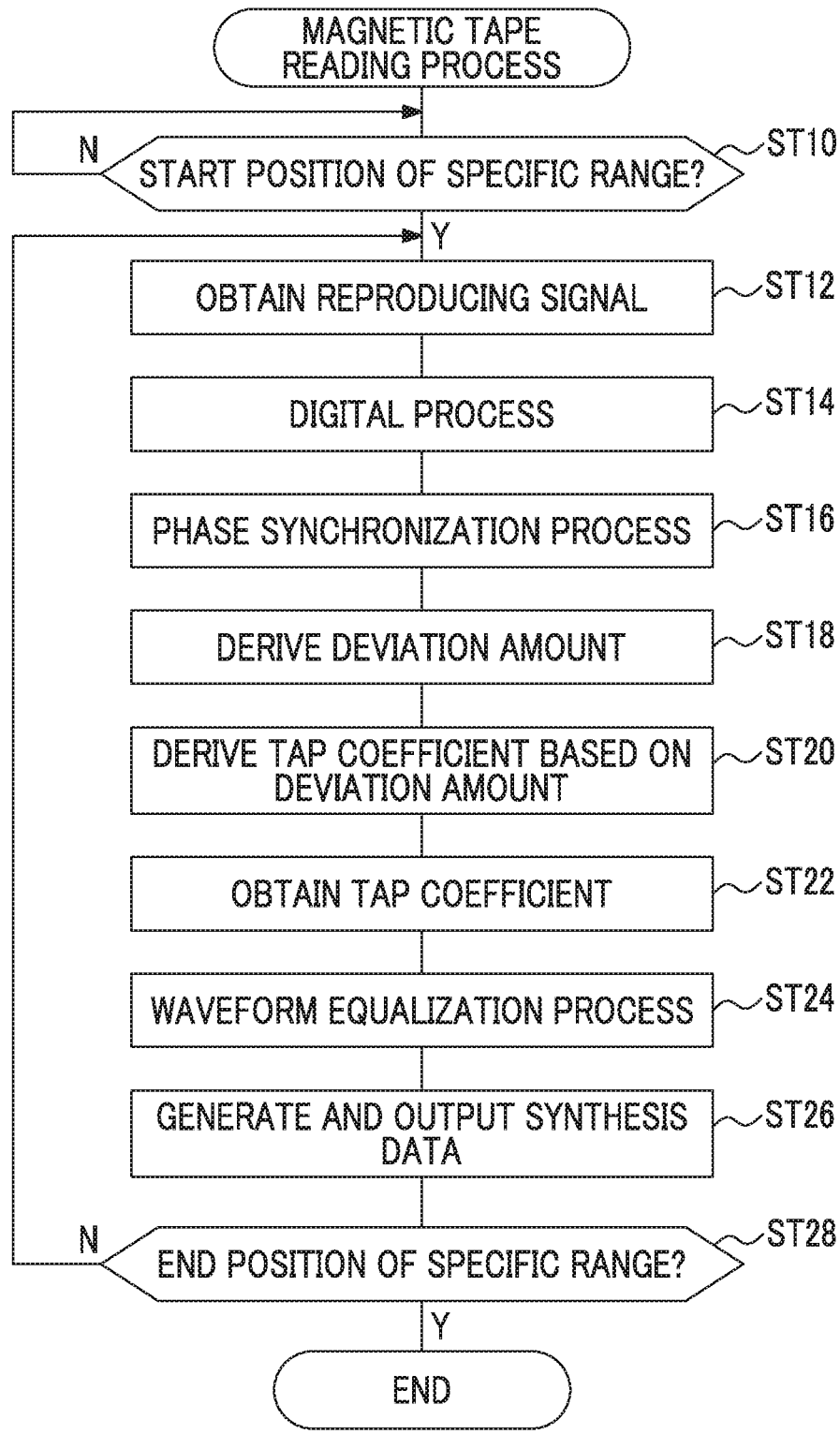
FIG. 10 is a flowchart showing an example of a flow of a magnetic tape reading process executed by the control device included in the magnetic tape reading apparatus according to the first embodiment.

FIG. 10 shows an example of a flow of a magnetic tape reading process executed by the control device 18 in a state where the magnetic tape MT runs along the running direction under the control of the control device 18. Hereinafter, the upstream side servo signal and the downstream side servo signal are simply referred to as a "servo signal", in a case where it is not necessary to describe these separately. Hereinafter, the description will be made assuming that the current position of the reading head 16 in the single track 30A is specified based on the servo signal by the controller 18A. Here, for convenience of description, the description will be made assuming that the specific range is a range of dozens of meters to few hundred meters.

In the magnetic tape reading process shown in FIG. 10, first, in Step ST10, controller 18A determines whether or not the reading unit 26 has reached a start position of the specific range of the single track 30A. In Step ST10, in a case where the reading unit 26 has not reached the start position of the specific range of the single track 30A, the determination result is negative and the determination in Step ST10 is performed again. In Step ST10, in a case where the reading unit 26 has reached the start position of the specific range of the single track 30A, the determination result is affirmative and the magnetic tape reading process proceeds to Step ST12.

In Step ST12, the signal processing circuit 18B obtains a reproducing signal from each of the upstream side reading element 26A and the downstream side reading element 26B and then the magnetic tape reading process proceeds to Step ST14.

In Step ST14, the signal processing circuit 18B performs a digital process with respect to the reproducing signal obtained in Step ST12, and then the magnetic tape reading process proceeds to Step ST16. In Step ST14, the AD converted upstream side reproducing signal sequence is generated by performing the amplification and the A/D conversion with respect to the reproducing signal from the upstream side reading element 26A. In Step ST14, the AD converted downstream side reproducing signal sequence is generated by performing the amplification and the A/D conversion with respect to the reproducing signal from the downstream side reading element 26B.

In Step ST16, the first phase synchronization circuit 74A performs the phase synchronization process with respect to the AD converted upstream side reproducing signal sequence, the second phase synchronization circuit 74B performs the phase synchronization process with respect to the AD converted downstream side reproducing signal sequence, and then the magnetic tape reading process proceeds to Step ST18. The first phase synchronization processed reproducing signal sequence is obtained by performing the phase synchronization process with respect to the AD converted upstream side reproducing signal sequence, and the second phase synchronization processed reproducing signal sequence is obtained by performing the phase synchronization process with respect to the AD converted downstream side reproducing signal sequence.

In Step ST18, the controller 18A derives the deviation amount based on the servo signal and then the magnetic tape reading process proceeds to Step ST20.

In Step ST20, the controller 18A derives the tap coefficient corresponding to the deviation amount derived in Step ST18 from the association table 18A1, and then the magnetic tape reading process proceeds to Step ST22. That is, in Step ST20, the tap coefficient corresponding to the upstream side deviation amount and the tap coefficient corresponding to the downstream side deviation amount are derived.

In Step ST22, the first equalizer 74C obtains the tap coefficient corresponding to the upstream side deviation amount from the controller 18A. In addition, in Step ST22, the second equalizer 74D obtains the tap coefficient corresponding to the downstream side deviation amount from the controller 18A, and then the magnetic tape reading process proceeds to Step ST24.

In Step ST24, the first equalizer 74C performs the waveform equalization process with respect to the first phase synchronization processed reproducing signal sequence by the one-dimensional FIR filter using the tap coefficient corresponding to the upstream side deviation amount. In addition, in Step ST24, the second equalizer 74D performs the waveform equalization process with respect to the second phase synchronization processed reproducing signal sequence by the one-dimensional FIR filter using the tap coefficient corresponding to the downstream side deviation amount, and then the magnetic tape reading process proceeds to Step ST26.

In Step ST26, the adder 74E generates synthesis data by adding the first waveform equalization processed reproducing signal sequence obtained by performing the waveform equalization process with respect to the first phase synchronization processed reproducing signal sequence by the first equalizer 74C and the second waveform equalization processed reproducing signal sequence obtained by performing the waveform equalization process with respect to the second phase synchronization processed reproducing signal sequence by the second equalizer 74D. The adder 74E outputs the generated synthesis data to the decoding unit 76 and then the magnetic tape reading process proceeds to Step ST28.

In Step ST28, the controller 18A determines whether or not the reading unit 26 has reached an end position of the specific range of the single track 30A. In Step ST28, in a case where the reading unit 26 has not reached the end position of the specific range of the single track 30A, the determination result is negative, and the magnetic tape reading process proceeds to Step ST12. In Step ST28, in a case where the reading unit 26 has reached the end position of the specific range of the single track 30A, the determination result is affirmative, and the magnetic tape reading process ends.

As described above, in the magnetic tape reading apparatus 10, the reading of data is performed by the reading unit 26 by a linear scan method plural times. The upstream side reproducing signal sequence and the downstream side reproducing signal sequence which are obtained by reading data by the reading unit 26 by a linear scan method plural times are synthesized by the synthesis unit 74

According to the magnetic tape reading apparatus 10, the reading is performed by the reading unit 26 by a linear scan method, and accordingly, occurrence frequency of the off-track is prevented, compared to a helical scan method. Accordingly, the synthesis data obtained by the synthesis unit 74 of the magnetic tape reading apparatus 10 has a high signal-to-noise ratio, compared to the reproducing signal sequence obtained by the reading of data by a helical scan method. In addition, the one time data reading and the two times of data reading in the specific range of the single track 30A have different reading paths from each other, and accordingly, a wide range of data is read in the tape width direction of the single track 30A, compared to a case where the reading of data is performed only one time. This also contributes to the improvement of the signal-to-noise ratio. Therefore, according to the magnetic tape reading apparatus 10, it is possible to prevent a deterioration in reliability of data read from the single track 30A by a linear scan method, compared to a case where the data is read by the reading only one time from the single track 30A by a linear scan method.

In the magnetic tape reading apparatus 10, the reading of data is performed plural times by each of the plurality of reading units 26 by a linear scan method. The upstream side reproducing signal sequence and the downstream side reproducing signal sequence which are obtained by reading data plural times by each of the reading unit 26 by a linear scan method are synthesized by the synthesis unit 74.

According to the magnetic tape reading apparatus 10, the reading is performed by the reading unit 26 by a linear scan method, and accordingly, occurrence frequency of the off-track is prevented, compared to a helical scan method. Accordingly, the synthesis data obtained by the synthesis unit 74 of the magnetic tape reading apparatus 10 has a high signal-to-noise ratio, compared to the reproducing signal sequence obtained by the reading of data by a helical scan method. In addition, the one time data reading and the two times of data reading in the specific range of the single track 30A corresponding to each of the reading units 26 have different reading paths from each other, and accordingly, a wide range of data is read in the tape width direction of the single track 30A corresponding to each of the reading units 26, compared to a case where the reading of data is performed only one time. This also contributes to the improvement of the signal-to-noise ratio. Therefore, according to the magnetic tape reading apparatus 10, it is possible to prevent a deterioration in reliability of data read from the single track 30A corresponding to each of the reading units 26 by a linear scan method, compared to a case where the data is read by the reading only one time from the single track 30A corresponding to each of the reading units 26 by a linear scan method.

In the magnetic tape reading apparatus 10, the upstream side reading element path and the downstream side reading element path are reading paths different from each other in the specific range of the single track 30A due to the environmental condition affecting the magnetic tape MT and/or the reading unit 26. The environmental condition unavoidably changes in each of the reading by the upstream side reading element 26A and the reading by the downstream side reading element 26B. Since the environmental condition unavoidably changes, the upstream side reading element path and the downstream side reading element path are reading paths different from each other. Since the upstream side reading element path and the downstream side reading element path are reading paths different from each other, a wide range of the data of the single track 30A in the tape width direction is read, compared to a case where the reading paths of the upstream side reading element path and the downstream side reading element path completely coincide with each other. Therefore, it is possible to increase the signal-to-noise ratio of the reproducing signal sequence obtained by reading the data, compared to a case where the reading paths of the upstream side reading element path and the downstream side reading element path completely coincide with each other.

In the magnetic tape reading apparatus 10, by causing each of the upstream side reading element 26A and the downstream side reading element 26B to read the data in the specific range, the data in the specific range is read plural times by the reading unit 26. Therefore, it is possible to read the data in the specific range plural times for a short period of time, compared to a case where the data in the specific range is read plural times only by the single reading element.

In the magnetic tape reading apparatus 10, the signal processing is performed with respect to the reproducing signal sequence by the signal processing circuit 18B. Therefore, it is possible to increase reliability of a final signal output from the magnetic tape reading apparatus 10, compared to a case where the signal processing is not performed with respect to the reproducing signal sequence.

In the magnetic tape reading apparatus 10, the phase synchronization process of synchronizing the phase of each of the AD converted upstream side reproducing signal sequence and the AD converted downstream side reproducing signal sequence in the running direction of the magnetic tape MT is performed. Therefore, it is possible to increase reliability of a final signal output from the magnetic tape reading apparatus 10, compared to a case where the phase synchronization process is not performed.

In the magnetic tape reading apparatus 10, the waveform equalization process is performed with respect to each of the first phase synchronization processed reproducing signal sequence and the second phase synchronization processed reproducing signal sequence. Therefore, it is possible to increase reliability of a final signal output from the magnetic tape reading apparatus 10, compared to a case where the waveform equalization process is not performed with respect to each of the upstream side reproducing signal sequence and the downstream side reproducing signal sequence.

In the magnetic tape reading apparatus 10, the waveform equalization process by the two-dimensional FIR filter is performed with respect to each of the first phase synchronization processed reproducing signal sequence and the second phase synchronization processed reproducing signal sequence. Therefore, it is possible to increase reliability of a final signal output from the magnetic tape reading apparatus 10, compared to a case where the waveform equalization process by the one-dimensional FIR filter is performed with respect to only the first phase synchronization processed reproducing signal sequence or the second phase synchronization processed reproducing signal sequence.

In the magnetic tape reading apparatus 10, the tap coefficient used in the waveform equalization process is determined in accordance with the deviation amount. Therefore, in the magnetic tape reading apparatus 10, it is possible to increase an accuracy of the waveform equalization process by the two-dimensional FIR filter, compared to a case where the tap coefficient is determined in accordance with a parameter with no relation with the deviation amount.

In the magnetic tape reading apparatus 10, the deviation amount is determined in accordance with the result obtained by reading the servo patterns 32 by the servo element pair 36. Therefore, in the magnetic tape reading apparatus 10, it is possible to easily determine the deviation amount, compared to a case where the servo patterns 32 are not applied to the magnetic tape MT.

In the magnetic tape reading apparatus 10, the reading operation by the reading unit is performed synchronously with the reading operation by the servo element pair 36. Therefore, in the magnetic tape reading apparatus 10, it is possible to decrease the occurrence frequency of the off-track, compared to a helical scan method by which a servo pattern and data cannot be synchronously read.

In the magnetic tape reading apparatus 10, the first waveform equalization processed reproducing signal sequence and the second waveform equalization processed reproducing signal sequence are synthesized by the synthesis unit 74 through the first buffer 66 and the second buffer 72. Therefore, it is possible to increase an accuracy of the obtained synthesis data, compared to a case where the synthesis is performed without buffer.

In the first embodiment, as shown in FIG. 10, the embodiment in which the processes in Step ST14 to Step ST26 are repeatedly performed each time the reproducing signal is obtained, during the time from when the reading unit 26 reaches the start position of the specific range till the reading unit reaches the end position of the specific range, has been described, but the technology of the disclosure is not limited thereto. For example, the processes in Step ST12 to Step ST18 are repeatedly performed during the time from when the reading unit 26 reaches the start position of the specific range till the reading unit reaches the end position of the specific range, and then, the process subsequent to Step ST20 may be performed. In this case, each of the upstream side reproducing signal sequence, the downstream side reproducing signal sequence, the upstream side deviation amount, and the downstream side deviation amount obtained by repeatedly performing the processes in Step ST12 to Step ST18 are held by a buffer (not shown) in time series. The tap coefficient corresponding to each of the upstream side deviation amount held in time series and the tap coefficient corresponding to each of the downstream side deviation amount held in time series may be derived based on the association table 18A1.

The technology of the disclosure is not limited thereto, and for example, the processes in Step ST12 to Step ST20 may be repeatedly performed during the time from when the reading unit 26 reaches the start position of the specific range till the reading unit reaches the end position of the specific range. In this case, each of the tap coefficient corresponding to the upstream side deviation amount and the tap coefficient corresponding to the downstream side deviation amount obtained by repeatedly performing the processes in Step ST12 to Step ST20 are held by a buffer (not shown) in time series. The waveform equalization process may be performed with respect to each of the first phase synchronization processed reproducing signal sequence and the second phase synchronization processed reproducing signal sequence based on the tap coefficient held in time series.

In the first embodiment, the embodiment in which the reading paths of the upstream side reading element path and the downstream side reading element path are set to be different from each other using a change in environmental condition occurring avoidably has been described, but the technology of the disclosure is not limited thereto. For example, the reading paths of the upstream side reading element path and the downstream side reading element path may be set to be different from each other by moving the upstream side reading head 16A and/or the downstream side reading head 16B in the tape width direction.

Figure 11:
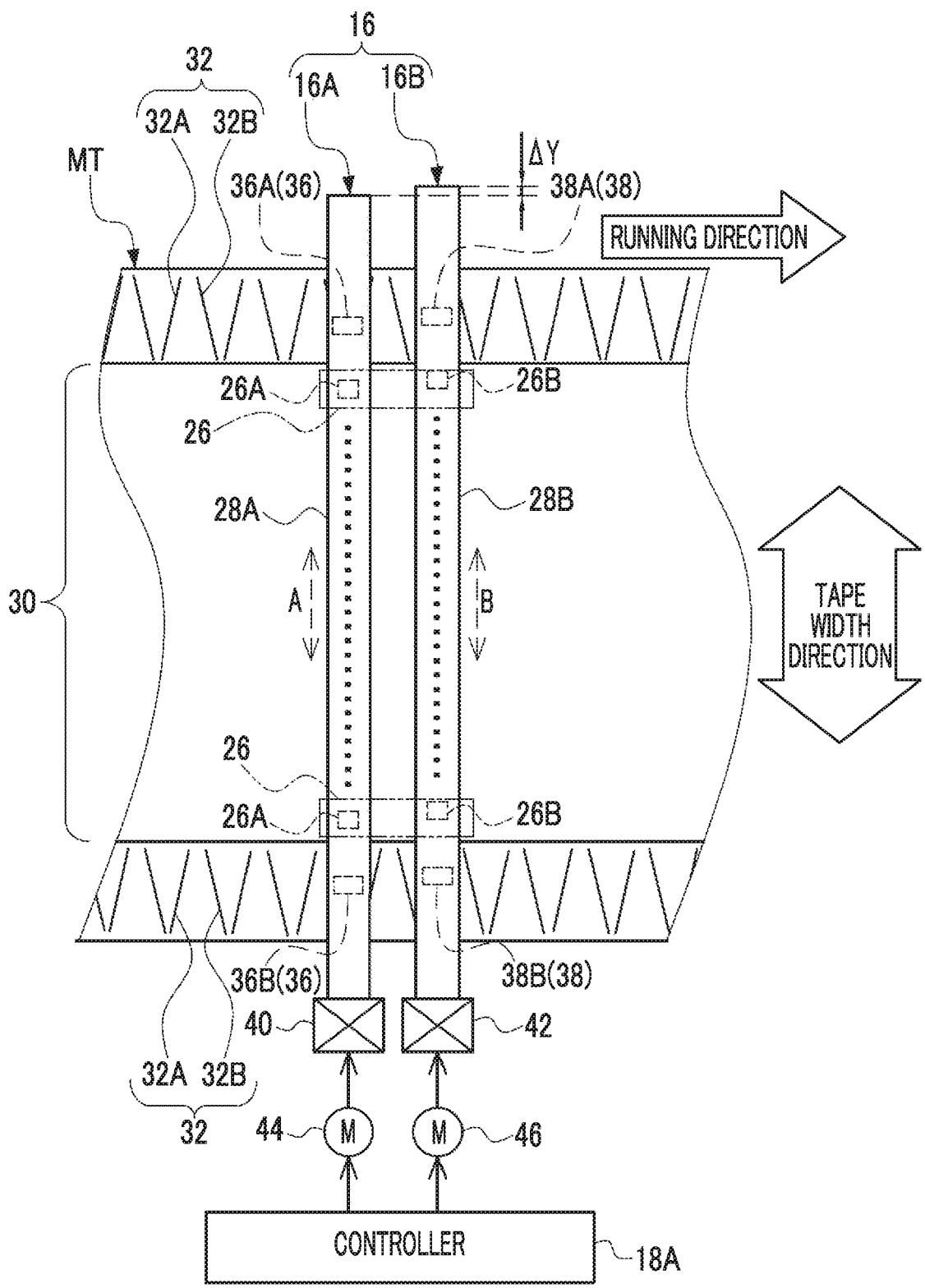
FIG. 11 is a plan conceptual view showing an embodiment in which a positional relationship between the upstream side reading head and the downstream side reading head included in the magnetic tape reading apparatus according to the first embodiment is adjusted.

In this case, as shown in FIG. 11 as an example, the upstream side reading element path and the downstream side reading element path may be moved in the tape width direction by operating the upstream side movement mechanism 40 and/or the downstream side movement mechanism 42 under the control of the controller 18A. That is, the positions of the upstream side reading element 26A and the downstream side reading element 26B in the tape width direction are changed in a range where the upstream side reading element 26A and the downstream side reading element 26B are not dropped off from the single track 30A, by operating the upstream side movement mechanism 40 and/or the downstream side movement mechanism 42. Therefore, it is possible to widen a reading range of data of the single track 30A in the tape width direction, compared to a case where the reading of data of the single track 30A is performed by the single reading element.

Figure 19:
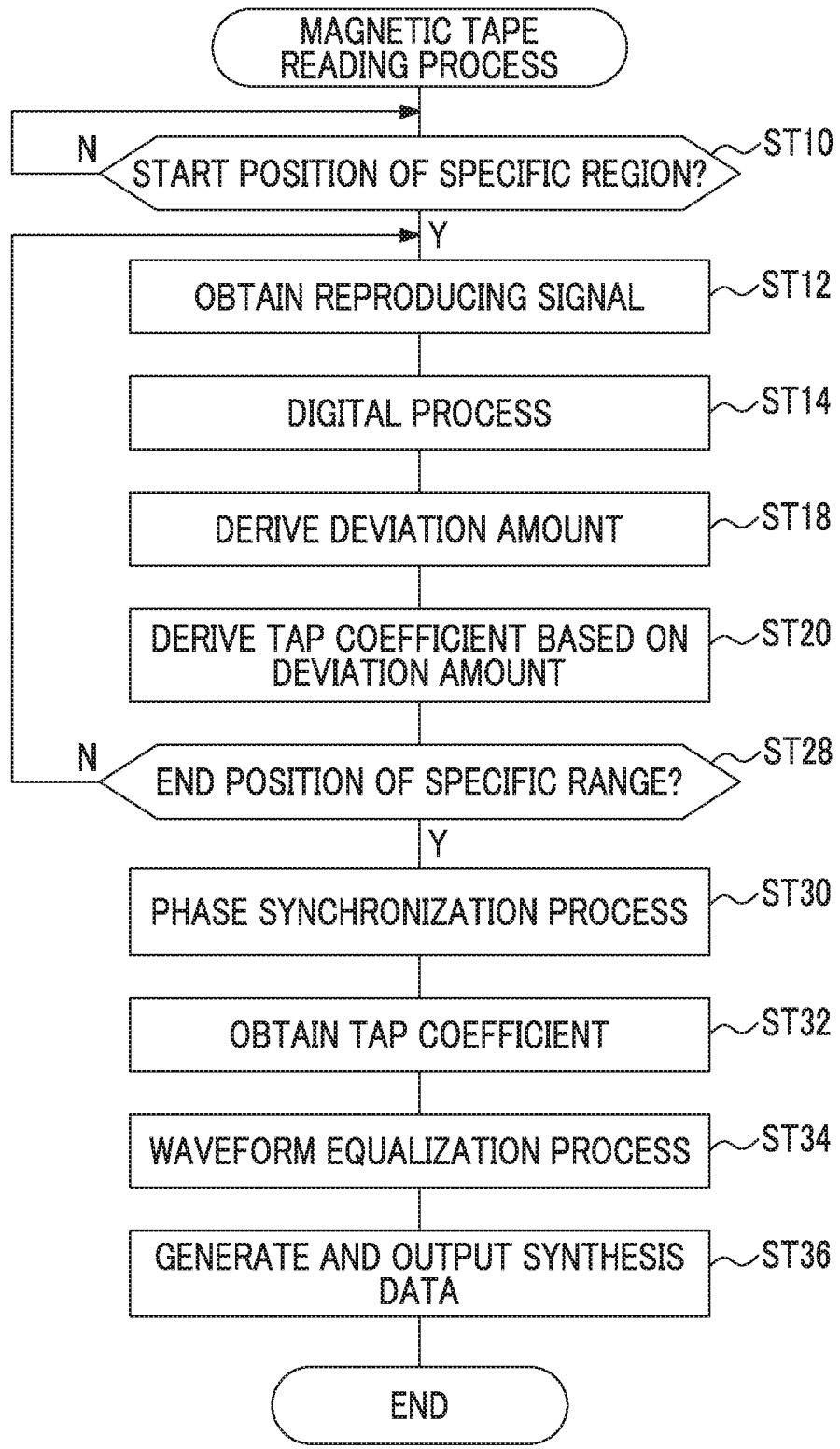
FIG. 19 is a flowchart showing a modification example of a flow of a magnetic tape reading process executed by the control device included in the magnetic tape reading apparatus according to the first embodiment.

In the first embodiment, in the magnetic tape reading process shown in FIG. 10, the embodiment in which each process in Step ST16, Step ST22, Step ST24, and Step ST26 is executed from Step ST10 to Step ST28 has been described, but this is merely an example, and the technology of the disclosure is not limited thereto. For example, as shown in FIG. 19 as an example, in a case where the determination result in Step ST28 is affirmative, each process in Step ST30 corresponding to Step ST16, Step ST32 corresponding to Step ST22, Step ST34 corresponding to Step ST24, and Step ST36 corresponding to Step ST26 may be executed. Each process included in the magnetic tape reading process shown in FIG. 10 and FIG. 19 is merely an example, and unnecessary steps may be removed, new steps may be added, and the process procedure may be changed, within a range not departing from the gist.

Second Embodiment

In the first embodiment, a case where the reading target region of data by the reading head 16 is only the track region 30 has been described, but in a second embodiment according to the technology of the disclosure, a case in which the plurality of track regions 30 are reading target regions of data will be described. In the second embodiment according to the technology of the disclosure, the same reference numerals are used for the same constituent elements as those in the first embodiment, and the description thereof is omitted. Hereinafter, the parts different from the first embodiment will be described.

Figure 12:
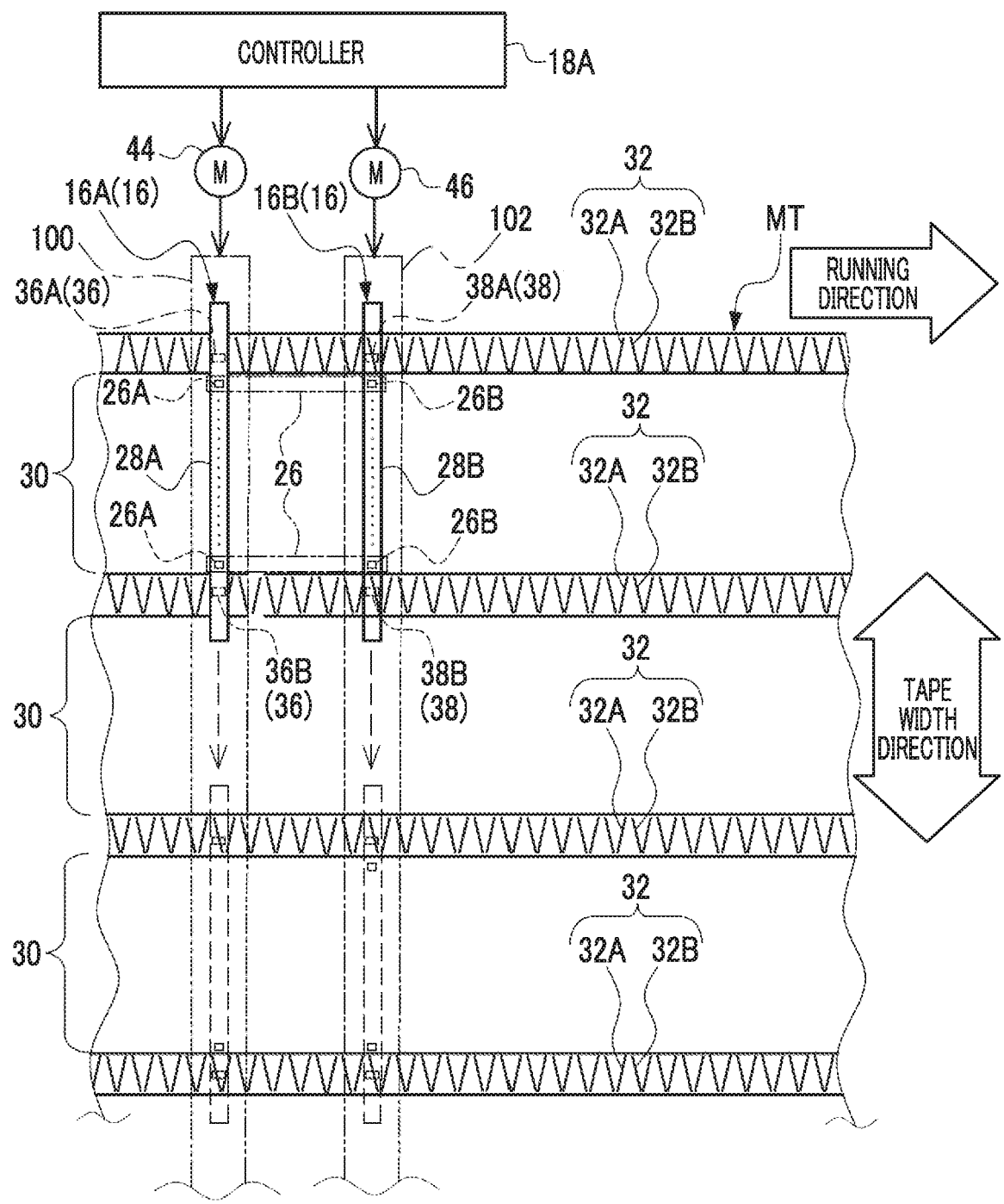
FIG. 12 is a schematic plan view showing an example of a configuration of a plan view of a reading head and a magnetic tape included in the magnetic tape reading apparatus according to the second embodiment.

As shown in FIG. 12 as an example, the magnetic tape MT according to the second embodiment according to the technology of the disclosure is different from the magnetic tape MT according to the first embodiment, in that the plurality of track regions 30 are provided in the tape width direction. In the magnetic tape MT according to the second embodiment according to the technology of the disclosure (in the second embodiment according to the technology of the disclosure, simply referred to as the "magnetic tape MT"), the track regions 30 are formed at regular intervals through a region where the servo patterns 32 are formed (hereinafter, referred to as a "servo pattern region"). The track region 30 includes a plurality of tracks, and accordingly, the magnetic tape MT including the plurality of track regions 30 means the magnetic tape MT including a plurality of sets of a plurality of tracks in the tape width direction.

The magnetic tape reading apparatus 10 according to the second embodiment according to the technology of the disclosure is different from the magnetic tape reading apparatus 10 according to the first embodiment in that an upstream side movement mechanism 100 is provided instead of the upstream side movement mechanism 40. The magnetic tape reading apparatus 10 according to the second embodiment according to the technology of the disclosure (in the second embodiment according to the technology of the disclosure, simply referred to as the "magnetic tape reading apparatus 10") is different from the magnetic tape reading apparatus 10 according to the first embodiment in that a downstream side movement mechanism 102 is provided instead of the downstream side movement mechanism 42. The upstream side movement mechanism 100 and the downstream side movement mechanism 102 are an example of a "first movement mechanism" according to the technology of the disclosure.

Each of the upstream side movement mechanism 100 and the downstream side movement mechanism 102 is disposed over the magnetic tape MT from one end to the other end of the magnetic tape MT in the tape width direction so as to cross the magnetic tape MT.

The upstream side reading head 16A is movably attached to the upstream side movement mechanism 100 from one end to the other end of the magnetic tape MT in the tape width direction. The downstream side reading head 16B is movably attached to the downstream side movement mechanism 102 from one end to the other end of the magnetic tape MT in the tape width direction.

The controller 18A controls the motor 44 to operate the upstream side movement mechanism 100 and move the upstream side reading head 16A in the tape width direction. A movement destination of the upstream side reading head 16A is on the track region 30 designated by the controller 18A. That is, the upstream side movement mechanism 100 moves the upstream side reading head 16A in the tape width direction so that each of the plurality of upstream side reading elements 26A is positioned on the single track 30A corresponding to an inner portion of the track region 30 designated by the controller 18A. Each upstream side reading element 26A included in the upstream side reading head 16A reads data from the single track 30A corresponding to an inner portion of the track region 30 which is the movement destination, in a state where the magnetic tape MT runs, under the control of the controller 18A.

The controller 18A controls the motor 46 to operate the downstream side movement mechanism 102 and move the downstream side reading head 16B in the tape width direction. A movement destination of the downstream side reading head 16B is on the track region 30 designated by the controller 18A. That is, the downstream side movement mechanism 102 moves the downstream side reading head 16B in the tape width direction so that each of the plurality of downstream side reading elements 26B is positioned on the single track 30A corresponding to an inner portion of the track region 30 designated by the controller 18A. Each downstream side reading element 26B included in the downstream side reading head 16B reads data from the single track 30A corresponding to an inner portion of the track region 30 which is the movement destination, in a state where the magnetic tape MT runs, under the control of the controller 18A. In the plurality of track regions 30, the downstream side reading head 16B moves with the upstream side reading head 16A in the same direction by the same distance, under the control of the controller 18A. That is, in the plurality of track regions 30, one of the upstream side reading head 16A and the downstream side reading head 16B follows the other one under the control of the controller 18A.

Next, an operation of the magnetic tape reading apparatus 10 which is a part according to the technology of the disclosure will be described with reference to FIG. 13.

Figure 13:
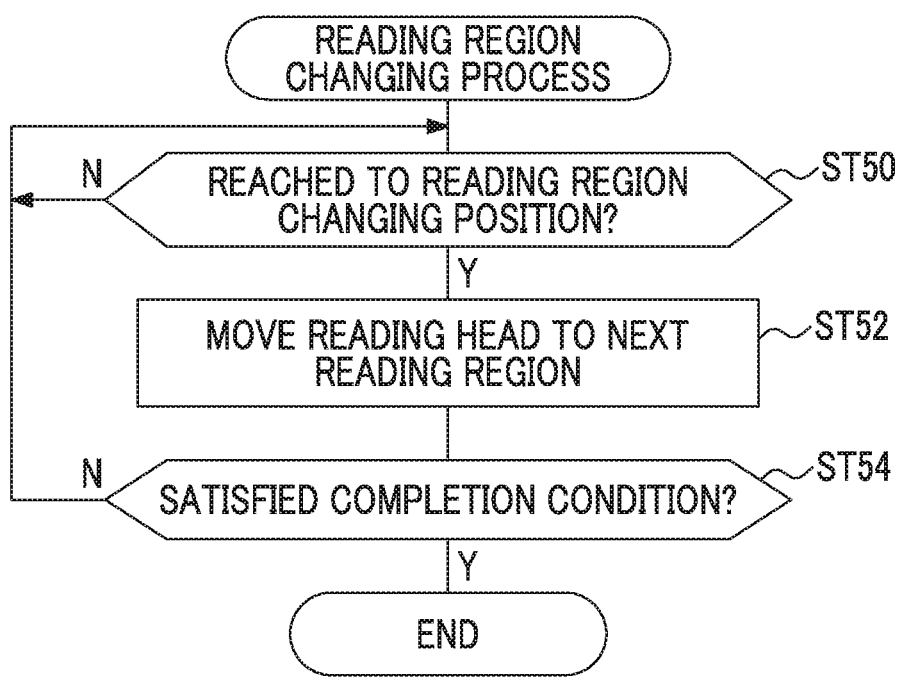
FIG. 13 is a flowchart showing an example of a flow of a reading region changing process executed by a control device included in the magnetic tape reading apparatus according to the second embodiment.
Figure 14:
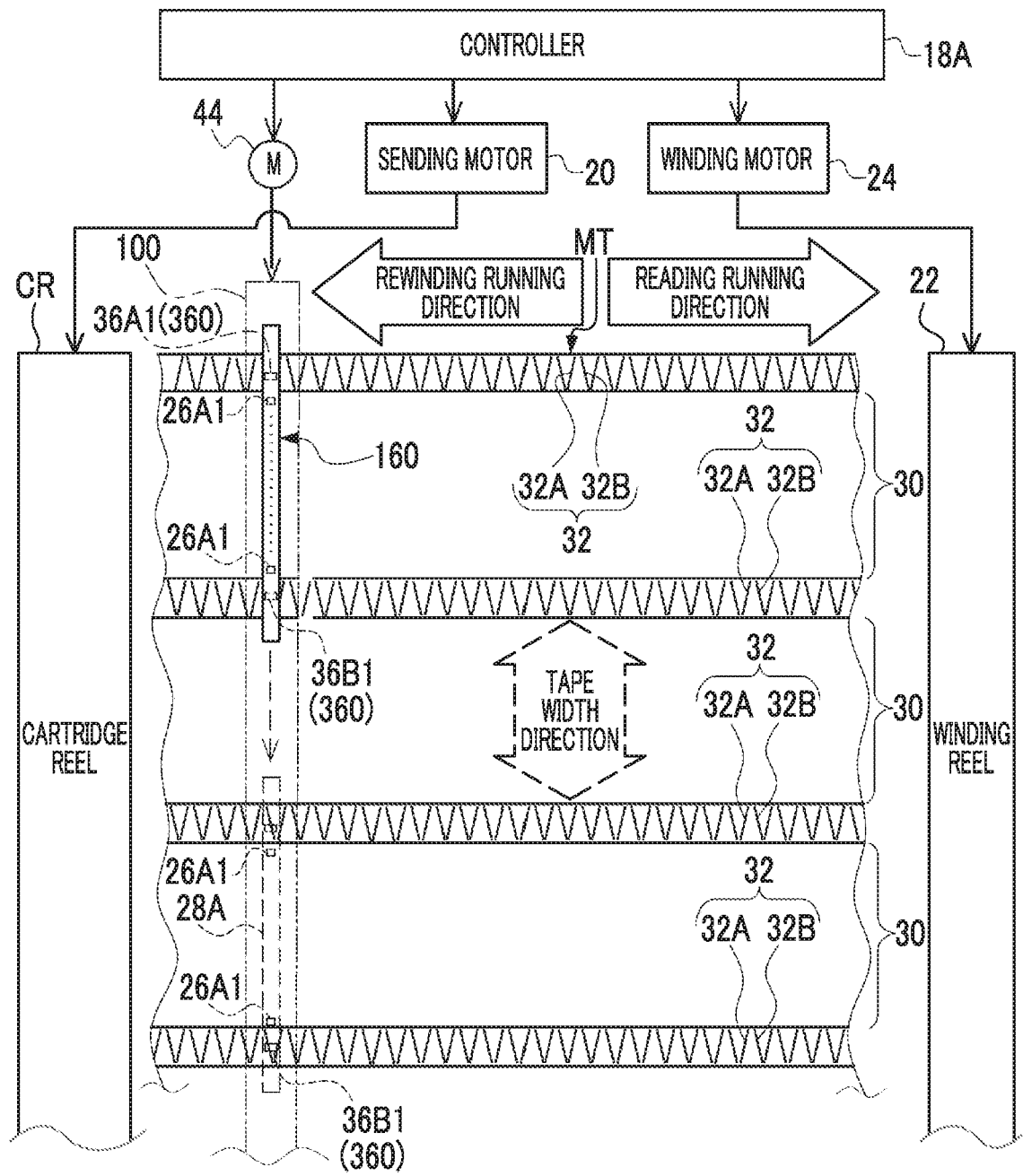
FIG. 14 is a schematic plan view showing an example of a configuration of a plan view of a reading head and a magnetic tape included in the magnetic tape reading apparatus according to the third embodiment.

FIG. 13 shows an example of a flow of a reading region changing process executed by the control device 18, in a state where the magnetic tape MT runs along the running direction under the control of the control device 18.

In the reading region changing process shown in FIG. 13, first, in Step ST50, the controller 18A determines whether or not the reading unit has reached a position to which the track region 30, which is a reading region of data by the reading head 16 is changed, (hereinafter, referred to as a "reading region changing position") based on the input servo signal. The reading region changing position is a position designated by the controller 18A. For example, in a case where the specific range described in the first embodiment is determined as a different position for each track region 30 in the running direction, for example, an end position of the specific range of one track region 30 is used as the reading region changing position.

In Step ST50, in a case where the reading unit 26 has not reached the reading region changing position, the determination result is negative and the determination in Step ST50 is performed again. In Step ST50, in a case where the reading unit 26 has reached the reading region changing position, the determination result is affirmative and the reading region changing process proceeds to Step ST52.

In Step ST52, the controller 18A controls the motors 44 and 46 to move the reading head 16 in the next reading region. The next reading region is the track region 30 designated by the controller 18A. That is, the controller 18A controls the motors 44 and 46 to move the reading head 16 on the track region 30 which is different from the track region 30, where the reading head 16 is currently positioned, and which is designated by the controller 18A.

In a case where the track region 30 which is a reading region of data by the reading head 16 is changed by executing the process in Step ST52, the magnetic tape reading process described in the first embodiment is executed by the control device 18 in a unit of the reading unit 26.

In Step ST54, the controller 18A determines whether or not the condition for completing the reading region changing process (hereinafter, referred to as a "reading region changing process completion condition") is satisfied. As the reading region changing process completion condition, for example, a condition in which the last part of the magnetic tape MT has reached, or a condition in which an instruction for completing the reading region changing process is applied to the magnetic tape reading apparatus 10 is used. In Step ST54, in a case where the reading region changing process completion condition is not satisfied, the determination result is negative and the reading region changing process proceeds to Step ST50. In Step ST54, in a case where the reading region changing process completion condition is satisfied, the determination result is affirmative and the reading region changing process ends.

As described above, in the magnetic tape reading apparatus 10, the controller 18A moves the reading head 16 so that the plurality of reading unit 26 is disposed in the plurality of tracks in the track region 30 designated among the plurality of track regions 30. The magnetic tape reading process described in the first embodiment is executed with respect to each of the reading units 26. Therefore, even in a case where the magnetic tape MT includes the plurality of track regions 30, the same effect as in the first embodiment is exhibited regarding each track in each track region 30.

In the second embodiment, the embodiment in which the data is read by disposing the upstream side reading head 16A and the downstream side reading head 16B on the track region 30 designated by the controller 18A has been described, but the technology of the disclosure is not limited thereto. For example, the data of each track region 30 may be read by the upstream side reading head 16A and the downstream side reading head 16B by disposing the upstream side reading head 16A and the downstream side reading head 16B with respect to each of all track regions 30 of the magnetic tape MT in the tape width direction. In a case where the data is read by disposing the upstream side reading head 16A and the downstream side reading head 16B with respect to each of all track regions 30, for example, the data may be read by disposing the upstream side reading head 16A and the downstream side reading head 16B on each track region 30 from one end to the other end in the tape width direction.

Third Embodiment

In the second embodiment, the embodiment in which the plural times of reading is realized by performing the reading of data by the upstream side reading element 26A and the downstream side reading element 26B has been described, but in a third embodiment according to the technology of the disclosure, a case where the plural times of reading is performed by a single reading element will be described. In the third embodiment according to the technology of the disclosure, the same reference numerals are used for the same constituent elements as those in the second embodiment, and the description thereof is omitted. Hereinafter, the parts different from the second embodiment will be described.

The magnetic tape reading apparatus 10 according to the third embodiment according to the technology of the disclosure is different from the magnetic tape reading apparatus 10 according to the second embodiment in that a reading head 160 is provided instead of the reading head 16. The reading head 160 is different from the reading head 16 in that the downstream side reading head 16B is not provided. In addition, reading head 160 includes a reading element 26A1 corresponding to the upstream side reading elements 26A of the upstream side reading head 16A. In the magnetic tape reading apparatus 10 according to the third embodiment according to the technology of the disclosure, one reading element 26A1 is allocated for each single track 30A. The reading element 26A1 is an example of "one reading element" according to the technology of the disclosure.

The reading head 160 includes a servo element pair 360 corresponding to the upstream side servo element pair 36 of the upstream side reading head 16A. The servo element pair 360 includes a servo element 36A1 corresponding to the upstream side servo element 36A of the upstream side servo element pair 36 and a servo element 36B1 corresponding to the upstream side servo element 36B of the upstream side servo element pair 36.

In the magnetic tape reading apparatus 10 according to the third embodiment according to the technology of the disclosure (in the third embodiment according to the technology of the disclosure, simply referred to as the "magnetic tape reading apparatus 10"), the controller 18A controls the sending motor 20 and the winding motor 24 to run the magnetic tape MT. The running direction of the magnetic tape MT is divided into a reading running direction and a rewinding running direction. The reading running direction is a direction corresponding to a forward direction of the magnetic tape MT and the rewinding running direction is a direction corresponding to a backward direction of the magnetic tape MT. The controller 18A causes the magnetic tape MT to run along the reading running direction, in a case of performing the reading of data by the reading head 160, and causes the magnetic tape MT to run along the rewinding running direction, in a case of rewinding the magnetic tape MT. The controller 18A causes the magnetic tape MT to run in the specific range twice along the reading running direction, to cause the reading element 26A1 to perform the reading of data twice in the specific range of the single track 30A.

Figure 15:
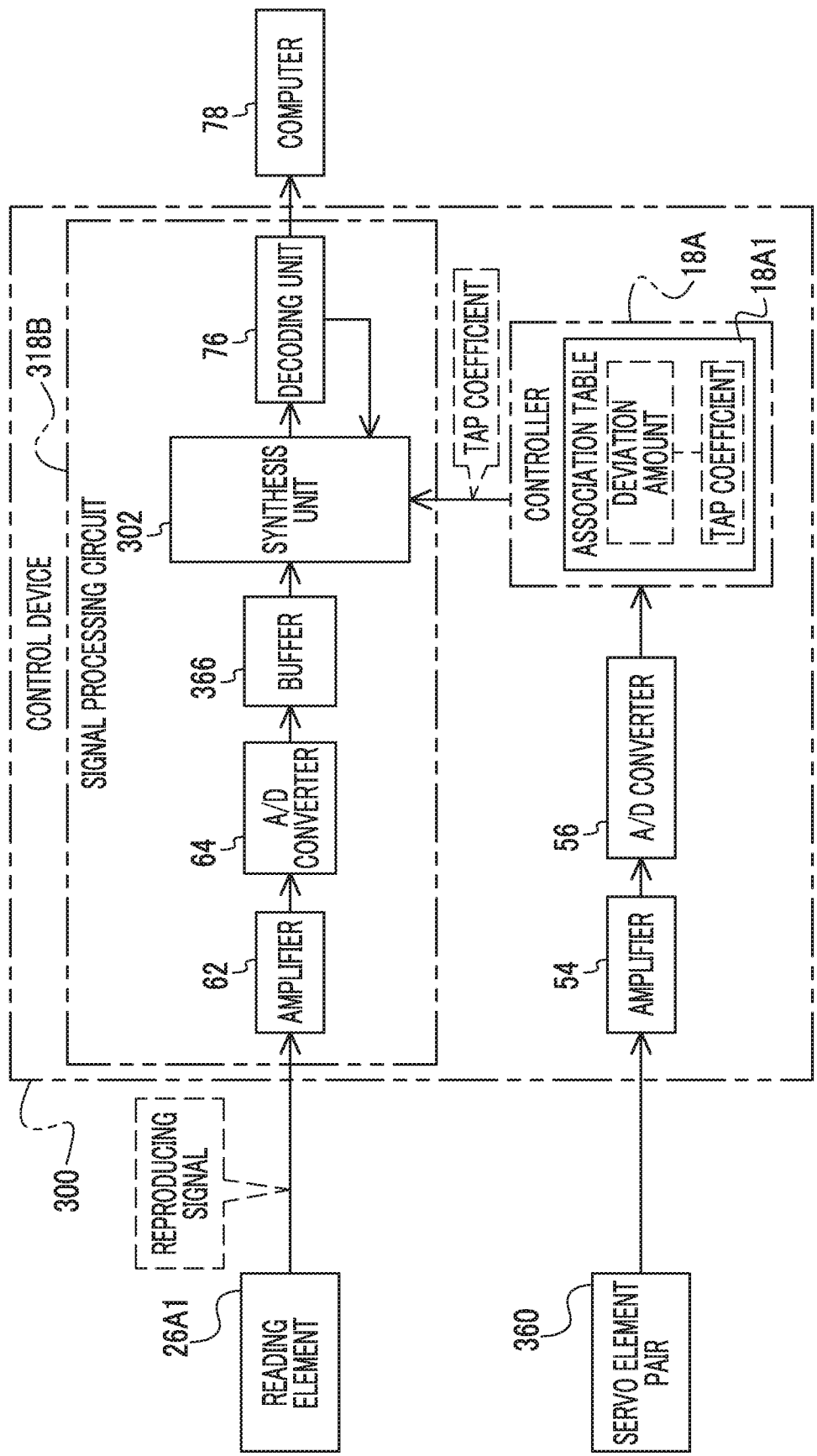
FIG. 15 is a block diagram showing an example of a mutual relationship of a reading element, a servo element pair, a control device, and a computer included in the magnetic tape reading apparatus according to the third embodiment.

As shown in FIG. 15 as an example, the magnetic tape reading apparatus 10 includes a control device 300. The control device 300 is different from the control device 18 shown in FIG. 6 in that a signal processing circuit 318B is provided instead of the signal processing circuit 18B. The signal processing circuit 318B is different from the signal processing circuit 18B in that the amplifier 68, the A/D converter 70, and the second buffer 72 are not provided. In addition, the signal processing circuit 318B is different from the signal processing circuit 18B in that a buffer 366 is provided instead of the first buffer 66. Further, the signal processing circuit 318B is different from the signal processing circuit 18B in that a synthesis unit 302 is provided instead of the synthesis unit 74.

The A/D converter 64 performs A/D conversion of a reproducing signal input from the amplifier 62. The A/D converter 64 outputs a digital signal obtained by the A/D conversion of the reproducing signal to the buffer 366 as an AD converted reproducing signal sequence. The buffer 366 temporarily holds the AD converted reproducing signal sequence input from the A/D converter 64.

In the third embodiment according to the technology of the disclosure, the AD converted reproducing signal sequence is divided into an AD converted first reproducing signal sequence and an AD converted second reproducing signal sequence. The AD converted first reproducing signal sequence is a reproducing signal sequence corresponding to the AD converted upstream side reproducing signal sequence described in the first embodiment, and the AD converted second reproducing signal sequence is a reproducing signal sequence corresponding to the AD converted downstream side reproducing signal sequence described in the first embodiment.

The AD converted first reproducing signal sequence is a reproducing signal sequence obtained by the first reading of data, and the AD converted second reproducing signal sequence is a reproducing signal sequence obtained by the second reading of data. The first reading of data indicates first reading of data, in a case where the reading of data is performed twice using the reading head 160 in the specific range of the single track 30A. The second reading of data indicates second reading of data, in a case where the reading of data is performed twice using the reading head 160 in the specific range of the single track 30A.

Figure 16:
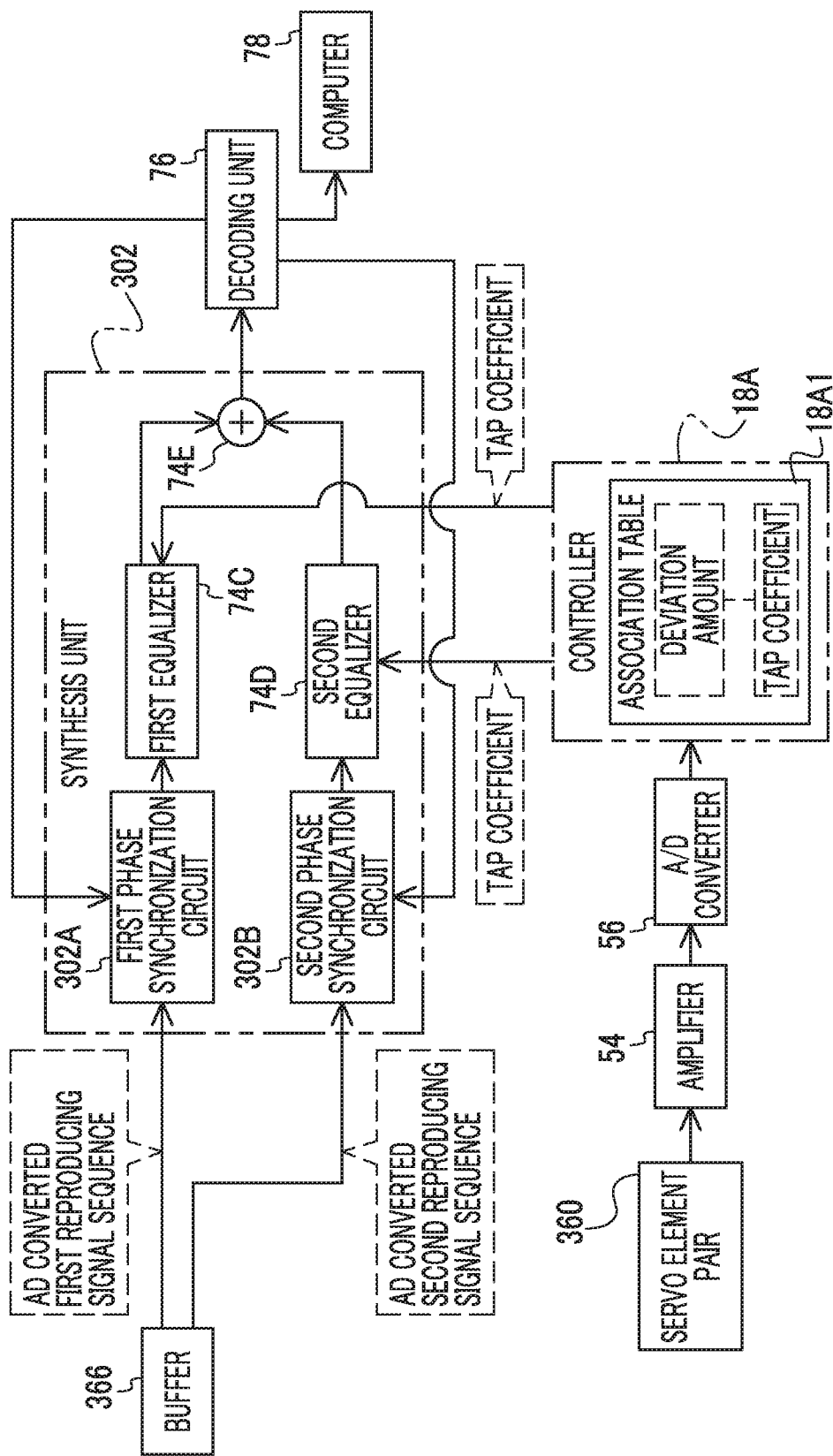
FIG. 16 is a block diagram showing an example of a synthesis unit and peripheral configurations included in the magnetic tape reading apparatus according to the third embodiment.

As shown in FIG. 16 as an example, the synthesis unit 302 is different from the synthesis unit 74 shown in FIG. 7 in that a first phase synchronization circuit 302A is provided instead of the first phase synchronization circuit 74A and a second phase synchronization circuit 302B is provided instead of the second phase synchronization circuit 74B. The first phase synchronization circuit 302A obtains the AD converted first reproducing signal sequence from the buffer 366 and performs the phase synchronization process with respect to the obtained AD converted first reproducing signal sequence by the method described in the first embodiment. The second phase synchronization circuit 302B obtains the AD converted second reproducing signal sequence from the buffer 366 and performs the phase synchronization process with respect to the obtained AD converted second reproducing signal sequence by the method described in the first embodiment. A phase synchronization processed first reproducing signal sequence is obtained by performing the phase synchronization process with respect to the AD converted first reproducing signal sequence, and a phase synchronization processed second reproducing signal sequence is obtained by performing the phase synchronization process with respect to the AD converted second reproducing signal sequence. The phase synchronization processed first reproducing signal sequence corresponds to the first phase synchronization processed reproducing signal sequence described in the first embodiment, and the phase synchronization processed second reproducing signal sequence corresponds to the second phase synchronization processed reproducing signal sequence described in the first embodiment.

In the same manner as in the first embodiment, the waveform equalization process is performed with respect to the phase synchronization processed first reproducing signal sequence by the first equalizer 74C. In the same manner as in the first embodiment, the waveform equalization process is performed with respect to the phase synchronization processed second reproducing signal sequence by the second equalizer 74D. A waveform equalization processed first reproducing signal sequence is obtained by performing the waveform equalization process with respect to the phase synchronization processed first reproducing signal sequence, and a waveform equalization processed second reproducing signal sequence is obtained by performing the waveform equalization process with respect to the phase synchronization processed second reproducing signal sequence. The waveform equalization processed first reproducing signal sequence corresponds to the first waveform equalization processed reproducing signal sequence described in the first embodiment, and the waveform equalization processed second reproducing signal sequence corresponds to the second waveform equalization processed reproducing signal sequence described in the first embodiment.

Next, the operation of the magnetic tape reading apparatus 10 which is a part according to the technology of the disclosure will be described with reference to FIGS. 17A and 17B.

Figure 17A:
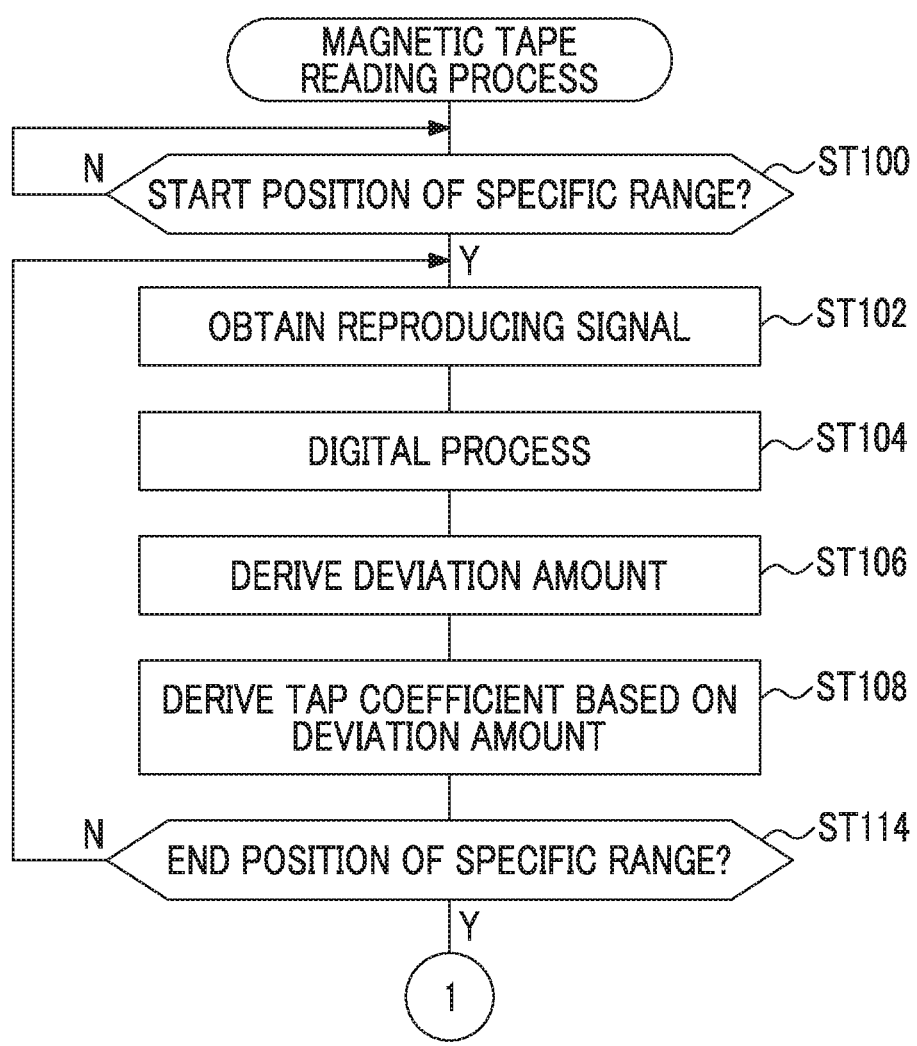
FIG. 17A is a flowchart showing an example of a flow of a magnetic tape reading process executed by the control device included in the magnetic tape reading apparatus according to the third embodiment.
Figure 17B:
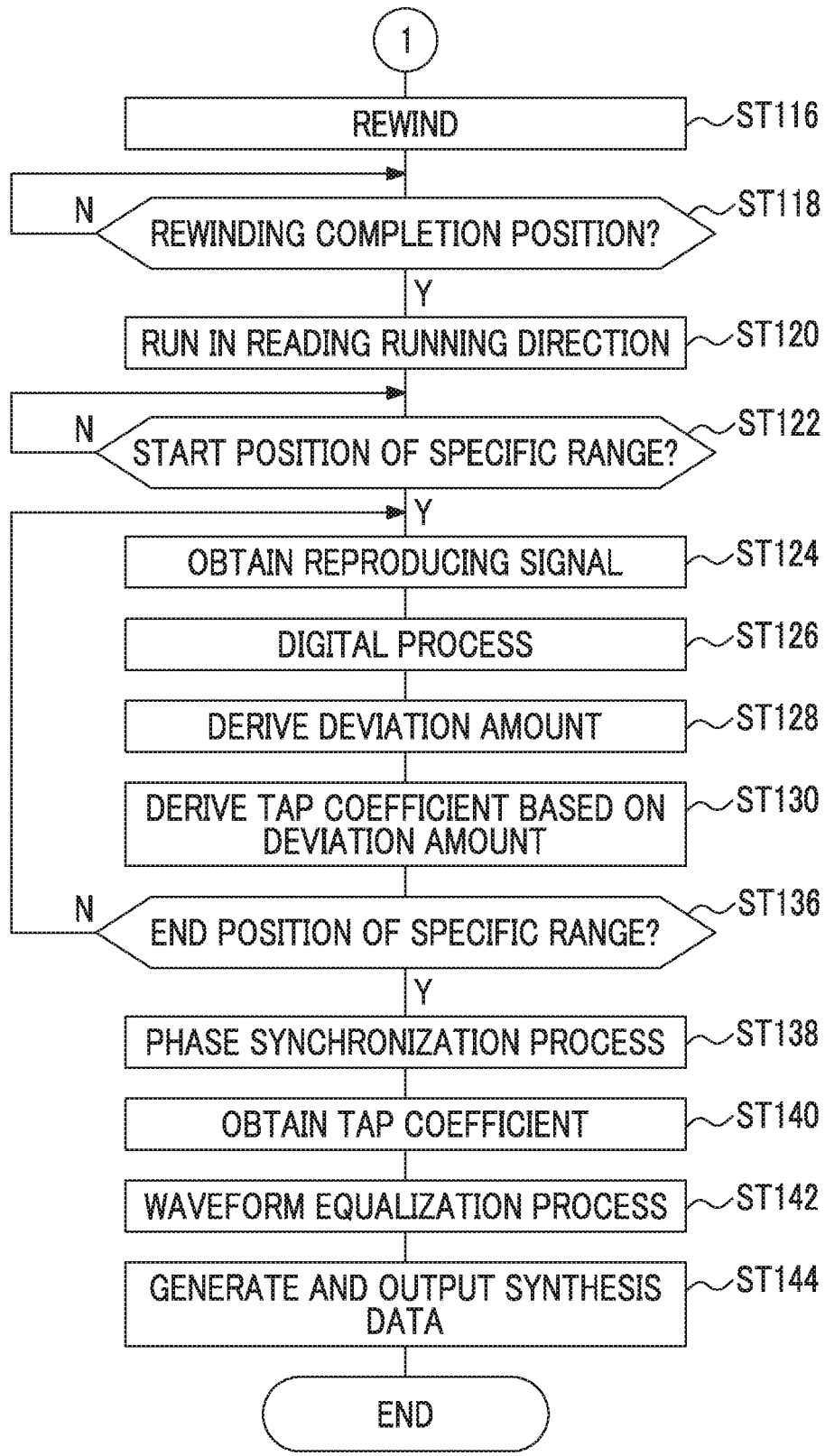
FIG. 17B is a flowchart continuing from the flowchart shown in FIG. 17A.

FIGS. 17A and 17B show an example of a flow of a magnetic tape reading process executed by the control device 18 in a state where the magnetic tape MT runs along the reading running direction under the control of the control device 18. Here, for convenience of description, the description will be made assuming that the specific range is a range of a part of the single track 30A in the running direction. Here, for convenience of description, the description will be made assuming that the specific range is a range of dozens of meters to few hundred meters.

In the magnetic tape reading process shown in FIG. 17A, first, in Step ST100, the controller 18A determines whether or not the reading element 26A1 has reached a start position of the specific range of the single track 30A. In Step ST100, in a case where the reading element 26A1 has not reached the start position of the specific range of the single track 30A, the determination result is negative and the determination in Step ST100 is performed again. In Step ST100, in a case where the reading element 26A1 has reached the start position of the specific range of the single track 30A, the determination result is affirmative and the magnetic tape reading process proceeds to Step ST102.

In Step ST102, the signal processing circuit 318B obtains a reproducing signal from the reading element 26A1 and then the magnetic tape reading process proceeds to Step ST104.

In Step ST104, the signal processing circuit 318B performs a digital process with respect to the reproducing signal obtained in Step ST102, and then the magnetic tape reading process proceeds to Step ST106. In Step ST104, the AD converted first reproducing signal sequence is generated by performing the amplification and the A/D conversion with respect to the reproducing signal from the reading element 26A1.

In Step ST106, the controller 18A derives the deviation amount based on the servo signal and then the magnetic tape reading process proceeds to Step ST108.

In Step ST108, the controller 18A derives the tap coefficient corresponding to the deviation amount derived in Step ST106 from the association table 18A1, and then the magnetic tape reading process proceeds to Step ST114.

In Step ST114, the controller 18A determines whether or not the reading unit 26 has reached an end position of the specific range of the single track 30A. In Step ST114, in a case where the reading unit 26 has not reached the end position of the specific range of the single track 30A, the determination result is negative, and the magnetic tape reading process proceeds to Step ST102. In Step ST114, in a case where the reading unit 26 has reached the end position of the specific range of the single track 30A, the determination result is affirmative, and the magnetic tape reading process proceeds to Step ST116 shown in FIG. 17B.

In Step ST116 shown in FIG. 17B, the controller 18A controls the sending motor 20 and the winding motor 24 to cause the magnetic tape MT to run along the rewinding running direction to rewind the magnetic tape MT and then the magnetic tape reading process proceeds to Step ST118.

In Step ST118, the controller 18A determines whether or not the reading element 26A1 has reached a rewinding completion position of the single track 30A. The rewinding completion position indicates a position outside of the specific range of the single track 30A which is in front of the start position of the specific range. The position in front of the start position of the specific range indicates a position where the reading element 26A1 moves beyond the start position of the specific range by rewinding the magnetic tape MT. The rewinding completion position may be a position where the reading element 26A1 reaches the start position of the specific range, in a case where the running of the magnetic tape MT is restarted along the reading running direction.

In Step ST118, in a case where the reading element 26A1 has not reached the rewinding completion position of the single track 30A, the determination result is negative and the determination in Step ST118 is performed again. In Step ST118, in a case where the reading element 26A1 has reached the rewinding completion position of the single track 30A, the determination result is affirmative and the magnetic tape reading process proceeds to Step ST120.

In Step ST120, the controller 18A controls the sending motor 20 and the winding motor 24 to cause the magnetic tape MT to run along the reading running direction and then the magnetic tape reading process proceeds to Step ST122.

In Step ST122, the controller 18A determines whether or not the reading element 26A1 has reached the start position of the specific range of the single track 30A. In Step ST122, in a case where the reading element 26A1 has not reached the start position of the specific range of the single track 30A, the determination result is negative and the determination in Step ST122 is performed again. In Step ST122, in a case where the reading element 26A1 has reached the start position of the specific range of the single track 30A, the determination result is affirmative and the magnetic tape reading process proceeds to Step ST124.

In Step ST124, the signal processing circuit 18B obtains the reproducing signal from the reading element 26A1 and then the magnetic tape reading process proceeds to Step ST126.

In Step ST126, the signal processing circuit 18B performs a digital process with respect to the reproducing signal obtained in Step ST124 and then the magnetic tape reading process proceeds to Step ST128. In Step ST126, the AD converted second reproducing signal sequence is generated by performing the amplification and the A/D conversion with respect to the reproducing signal from the reading element 26A1.

In Step ST128, the controller 18A derives the deviation amount based on the servo signal and then the magnetic tape reading process proceeds to Step ST130.

In Step ST130, the controller 18A derives the tap coefficient corresponding to the deviation amount derived in Step ST128 from the association table 18A1, and then the magnetic tape reading process proceeds to Step ST136.

In Step ST136, the controller 18A determines whether or not the reading unit 26 has reached the end position of the specific range of the single track 30A. In Step ST136, in a case where the reading unit 26 has not reached the end position of the specific range of the single track 30A, the determination result is negative and the magnetic tape reading process proceeds to Step ST124. In Step ST136, in a case where the reading unit 26 has reached the end position of the specific range of the single track 30A, the determination result is affirmative and the magnetic tape reading process proceeds to Step ST138.

In Step ST138, the first phase synchronization circuit 302A performs the phase synchronization process with respect to the AD converted first reproducing signal sequence, the second phase synchronization circuit 302B performs the phase synchronization process with respect to the AD converted second reproducing signal sequence, and the magnetic tape reading process proceeds to Step ST140. The phase synchronization processed first reproducing signal sequence is obtained by performing the phase synchronization process with respect to the AD converted first reproducing signal sequence, and the phase synchronization processed second reproducing signal sequence is obtained by performing the phase synchronization process with respect to the AD converted second reproducing signal sequence.

In Step ST140, the first equalizer 74C obtains the tap coefficient corresponding to the deviation amount derived in Step ST108 from the controller 18A, the second equalizer 74D obtains the tap coefficient corresponding to the deviation amount derived in Step ST130 from the controller 18A, and then the magnetic tape reading process proceeds to Step ST142.

In Step ST142, the first equalizer 74C performs the waveform equalization process by the one-dimensional FIR filter using the tap coefficient obtained in Step ST140 with respect to the phase synchronization processed first reproducing signal sequence, the second equalizer 74D performs the waveform equalization process by the one-dimensional FIR filter using the tap coefficient obtained in Step ST140 with respect to the phase synchronization processed second reproducing signal sequence, and then the magnetic tape reading process proceeds to Step ST144. The waveform equalization processed first reproducing signal sequence is obtained by performing the waveform equalization process with respect to the phase synchronization processed first reproducing signal sequence, and the waveform equalization processed second reproducing signal sequence is obtained by performing the waveform equalization process with respect to the phase synchronization processed second reproducing signal sequence.

In Step ST144, the adder 74E generates the synthesis data by adding the waveform equalization processed first reproducing signal sequence and the waveform equalization processed second reproducing signal sequence. The adder 74E outputs the generated synthesis data to the decoding unit 76 and then the magnetic tape reading process ends.

In the magnetic tape reading process, a case where one reading element 26A1 performs the reading of data with respect to the corresponding single track 30A has been exemplified, but the technology of the disclosure is not limited thereto. That is, the plurality of reading elements 26A1 is provided in the reading head 160, and the magnetic tape reading process shown in FIGS. 17A and 17B is applied to the reading of data by each of all reading elements 26A1.

As described above, in the magnetic tape reading apparatus 10, the control of the reading element 26A1 to read data from the specific range twice is performed. The first data reading path and the second data reading path are different depending on environmental condition, and accordingly, a wide range of data is read in the tape width direction of the single track 30A corresponding to each reading unit 26, compared to a case where the reading of data is performed only one time. Therefore, compared to a case where the data is read by reading from the single track 30A by a linear scan method only one time, it is possible to prevent a deterioration in reliability of data read from the single track 30A by a linear scan method.

In the third embodiment, the two times of reading of data has been exemplified, but the technology of the disclosure is not limited thereto, and three or more times of the reading of data may be performed. In this case, reproducing signal sequence of plural times of reading is generated and synthesized by the adder 74E.

In the third embodiment, as shown in FIG. 17A, the embodiment in which the processes in Step ST104 to Step ST108 are repeatedly performed each time the reproducing signal is obtained, during the time from when the reading element 26A1 reaches the start position of the specific range till the reading unit reaches the end position of the specific range, has been described, but the technology of the disclosure is not limited thereto. For example, the processes in Step ST102 to Step ST106 are repeatedly performed during the time from when the reading element 26A1 reaches the start position of the specific range till the reading unit reaches the end position of the specific range, and then, the process subsequent to Step ST108 may be performed. In this case, each of the first reproducing signal sequence and the deviation amount obtained by repeatedly performing the processes in Step ST102 to Step ST106 are held by a buffer (not shown) in time series. The tap coefficient corresponding to each of the deviation amount held in time series may be derived based on the association table 18A1.

In the third embodiment, as shown in FIG. 17B, the embodiment in which the processes in Step ST126 to Step ST130 are repeatedly performed each time the reproducing signal is obtained, during the time from when the reading element 26A1 reaches the start position of the specific range till the reading unit reaches the end position of the specific range, has been described, but the technology of the disclosure is not limited thereto. For example, the processes in Step ST124 to Step ST128 are repeatedly performed during the time from when the reading element 26A1 reaches the start position of the specific range till the reading unit reaches the end position of the specific range, and then, the process subsequent to Step ST130 may be performed. In this case, each of the second reproducing signal sequence and the deviation amount obtained by repeatedly performing the processes in Step ST124 to Step ST128 are held by a buffer (not shown) in time series. The tap coefficient corresponding to each of the deviation amount held in time series may be derived based on the association table 18A1.

The technology of the disclosure is not limited thereto, for example, the process in each step subsequent to Step ST138 may be started before the reading element 26A1 reaches the end position of the specific range after the reading unit reaches the start position of the specific range in the second data reading, that is, without waiting for the completion of the second data reading. In this case, the reproducing signal sequence and the deviation amount generated from the start of the process of each step subsequent to Step ST138 till the reading unit reaches the end position of the specific range, and the tap coefficient corresponding to the deviation amount are temporarily held by a buffer (not shown) in time series. The phase synchronization process may be sequentially performed in a step where the reproducing signal sequence, the deviation amount, and the tap coefficient corresponding to the deviation amount necessary for proceeding the process in each step subsequent to Step ST138 are accumulated in a data buffer. For example, in a case where the reproducing signal sequence and the deviation amount and the tap coefficient corresponding to the deviation amount obtained in the first data reading are stored in a buffer (in a case where the process shown in FIG. 17A has completed), the process can proceeds to the process in each step subsequent to Step ST138 without waiting for the completion of all operations of the second data reading (without waiting for the affirmative determination in Step ST136). Therefore, it is possible to reduce a size of a buffer used in the second data reading and to reduce a delay until the process in each step subsequent to Step ST138 is started.

In each embodiment, the two-dimensional FIR filter has been exemplified, but the technology of the disclosure is not limited thereto. For example, the two-dimensional IIR filter may be used instead of the two-dimensional FIR filter. In this case, the coefficient used in the IIR filter may be used instead of the tap coefficient. The "coefficient" here indicates a "parameter" according to the technology of the disclosure. As described above, even in a case where the two-dimensional IIR filter is used instead of the two-dimensional FIR filter, the same effect as the effect described in each embodiment can be obtained.

In each embodiment, the device including ASIC as the control devices 18 and 300 (hereinafter, referred to as a "control device" without reference numerals) has been exemplified, but the technology of the disclosure is not limited thereto. For example, the control device may be realized with a software configuration by a computer.

Figure 18:
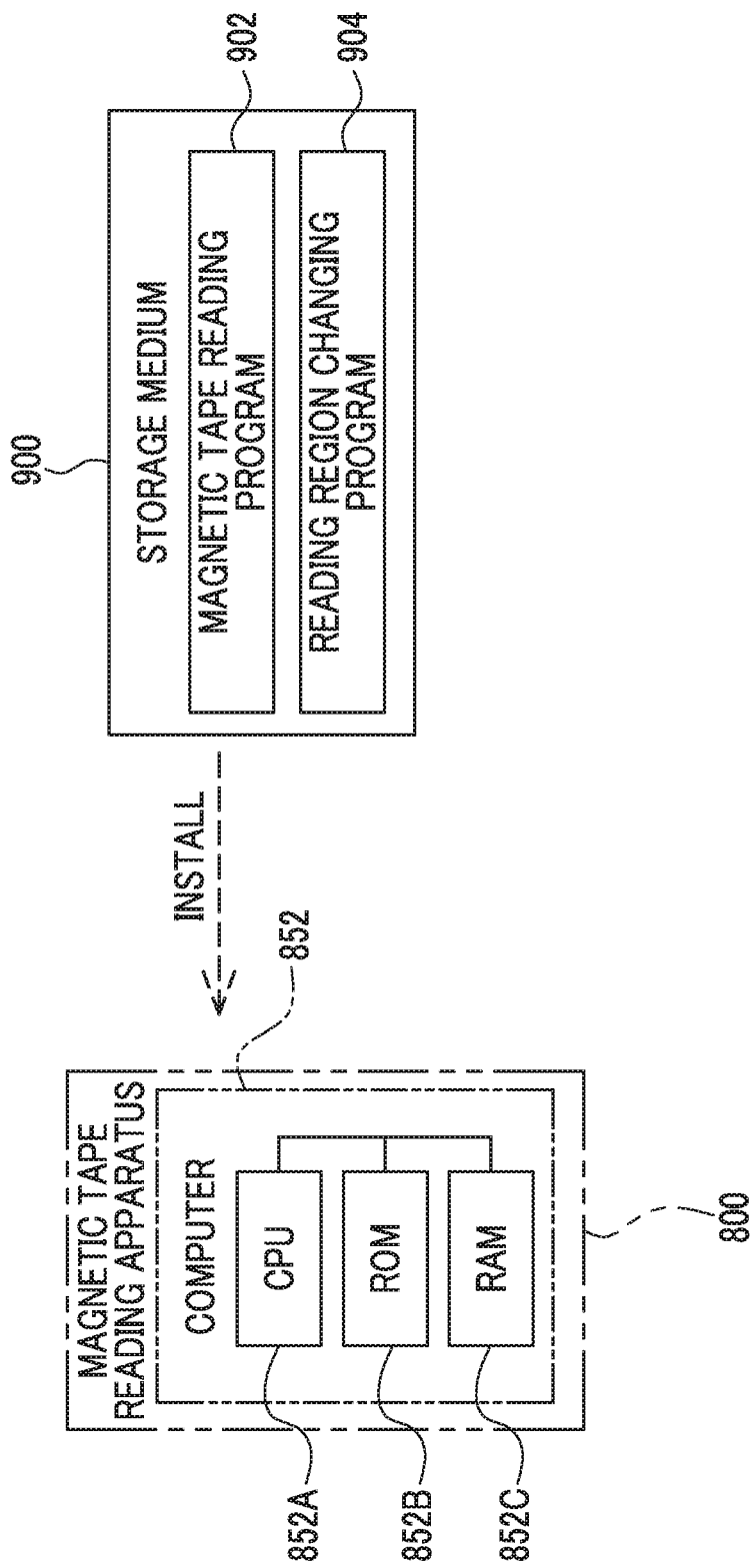
FIG. 18 is a conceptual view showing an example of an aspect in which a magnetic tape reading program and a reading region changing program are installed in a computer of a magnetic tape reading apparatus from a storage medium in which the magnetic tape reading program and the reading region changing program are stored.

In this case, for example, as shown in FIG. 18, a magnetic tape reading apparatus 800 may be used instead of the magnetic tape reading apparatus 10. The magnetic tape reading apparatus 800 is different from the magnetic tape reading apparatus 10 in that a device including a computer 852 is provided instead of the control device. In an example shown in FIG. 18, a storage medium 900 stores a magnetic tape reading program 902 and a reading region changing program 904. The magnetic tape reading program 902 is a program for causing the computer 852 to execute the magnetic tape reading process described above. The reading region changing program 904 is a program for causing the computer 852 to execute the reading region changing process.

The computer 852 includes a CPU 852A, a ROM 852B, and a RAM 852C. The magnetic tape reading program 902 and the reading region changing program 904 stored in the storage medium 900 are installed in the computer 852, and the CPU 852A executes the magnetic tape reading process according to the magnetic tape reading program 902. In addition, the CPU 852A executes the reading region changing process according to the reading region changing program 904.

In the example shown in FIG. 18, the CPU 852A is a single CPU, but the technology of the disclosure is not limited thereto, and a plurality of CPUs may be used. As an example of the storage medium 900, any portable storage medium such as an SSD or USB memory is used.

The magnetic tape reading program 902 and/or the reading region changing program 904 may be stored in advance in a storage unit of another computer or a server device connected to the computer 852 through a communication network (not shown), and the magnetic tape reading program 902 and/or the reading region changing program 904 may be downloaded in the computer 852 in accordance with a request of the magnetic tape reading apparatus 800. In this case, the downloaded magnetic tape reading program 902 and/or reading region changing program 904 may be executed by the CPU 852A of the computer 852.

As a hardware resource for executing the magnetic tape reading process and/or reading region changing process described above (hereinafter, referred to as "various processes"), various processors shown below can be used. As the processor, for example, as described above, a CPU which is a general-purpose processor functioning as the hardware resources for executing various processes by executing software, that is, a program is used. In addition, as the processor, for example, a dedicated electric circuit which is a processor having a circuit configuration designed to be dedicated to executing a specific process such as FPGA, PLD, or ASIC is used.

The hardware resource for executing various processes may be configured with one of the various processors described above or may be configured with a combination of two or more processors which are the same type or different types (for example, combination of plurality of FPGAs or combination of CPU and FPGA). In addition, the hardware resource for executing various processes may be one processor.

As an example of the configuration with one processor, first, one processor is configured with a combination of one or more CPUs and software as represented by a computer of a client and a server, and this processor may function as a hardware resource for executing various processes. Secondly, as represented by SoC, a processor of realizing one function of all systems including the plurality of hardware resources for executing various processes with one IC chip may be used. As described above, various processes are realized using one or more of various processors as the hardware resource.

In addition, as hardware structure of the various processors, more specifically, an electric circuit obtained by combining a circuit element such as a semiconductor element can be used.

The various processes described above are merely an example. Accordingly, unnecessary steps may be removed, new steps may be added, and the process procedure may be changed, within a range not departing from the gist.

The contents described and the contents shown hereinabove are specific descriptions regarding the part according to the technology of the disclosure and these are merely an example of the technology of the disclosure. For example, the descriptions regarding the configurations, the functions, the operations, and the effects are descriptions regarding an example of the configurations, the functions, the operations, and the effects of the part according to the technology of the disclosure. Thus, in the contents described and the contents shown hereinabove, unnecessary parts may be removed, new elements may be added or replaced within a range not departing from the gist of the technology of the disclosure. In addition, in order to avoid complication and easily understand the part according to the technology of the disclosure, in the contents described and the contents shown hereinabove, the description regarding common general technical knowledge which is not necessarily particularly described for performing the technology of the disclosure is omitted.

In the specification, "A and/or B" is identical to "at least one of A or B". That is, "A and/or B" may be only A, only B, or a combination of A and B. In the specification, even in a case of expressing three or more items with the expression of "and/or", the same description regarding "A and/or B" is applied.

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. A magnetic tape reading apparatus comprising:
   a reading head which includes a reading unit disposed at a position corresponding to a single track included in a magnetic tape;
   a controller which controls the reading unit to read data plural times from a range of the single track in a running direction of the magnetic tape by a linear scan method, the range being a part or an entirety of the single track; and
   a synthesis unit which synthesizes a plurality of reproducing signal sequences obtained by reading data plural times from the range by the reading unit,
   wherein reading paths for plural times of reading operations with respect to the range by the reading unit are reading paths different from each other depending on environmental conditions affecting at least one of the magnetic tape or the reading unit for each of the plural times of reading operations in the range.

2. A magnetic tape reading apparatus comprising:
   a reading head which includes a plurality of reading units disposed at positions respectively corresponding to a plurality of tracks included in a magnetic tape;
   a controller which controls each of the plurality of reading units to read data plural times from a range of a single track having the corresponding position among the plurality of tracks, in a running direction of the magnetic tape, by a linear scan method, the range being a part or an entirety of the single track;

a synthesis unit which synthesizes a plurality of reproducing signal sequences obtained by reading data plural times from the range by each of the plurality of reading units, and a first movement mechanism that moves the reading head in a width direction of the magnetic tape, wherein the magnetic tape has a plurality of sets of the plurality of tracks in a width direction, and the controller controls the first movement mechanism to move the reading head to a position where the plurality of reading units are to be disposed on the plurality of tracks of a designated set among the plurality of sets, and controls each of the plurality of reading units to read data plural times from the range of the single track of the designated set.

3. A magnetic tape reading apparatus comprising:

a reading head which includes a reading unit disposed at a position corresponding to a single track included in a magnetic tape;

a controller which controls the reading unit to read data plural times from a range of the single track in a running direction of the magnetic tape by a linear scan method, the range being a part or an entirety of the single track;

a synthesis unit which synthesizes a plurality of reproducing signal sequences obtained by reading data plural times from the range by the reading unit; and a second movement mechanism that moves the reading head in a width direction of the magnetic tape, wherein the controller controls the second movement mechanism to vary reading paths for plural times of reading operations with respect to the range by the reading unit, by moving the reading head in the width direction.

4. The magnetic tape reading apparatus according to claim 1, wherein the reading unit includes a plurality of reading elements along the running direction of the magnetic tape with respect to the single track, and the controller controls each of the plurality of reading elements to read data from the range to thereby control the reading unit to read data plural times from the range.

5. The magnetic tape reading apparatus according to claim 1, wherein the reading unit includes one reading element for each single track, and the controller controls the reading element to read data plural times from the range.

6. The magnetic tape reading apparatus according to claim 1, further comprising:

a signal processing unit which performs signal processing with respect to the reproducing signal sequence.

7. The magnetic tape reading apparatus according to claim 6, wherein the signal processing is a process including a phase synchronization process of synchronizing a phase of the reproducing signal sequence in the running direction.

8. The magnetic tape reading apparatus according to claim 6, wherein the signal processing is a process including a waveform equalization process with respect to each of the plurality of reproducing signal sequences.

9. The magnetic tape reading apparatus according to claim 8, wherein the waveform equalization process is a waveform equalization process by a two-dimensional FIR filter or a waveform equalization process by a two-dimensional IIR filter.

10. The magnetic tape reading apparatus according to claim 9, wherein a parameter used in the two-dimensional FIR filter and the two-dimensional IIR filter is determined in accordance with a deviation amount of positions between the single track and the reading unit.

11. The magnetic tape reading apparatus according to claim 10, wherein the reading head includes a servo element, and the deviation amount is determined in accordance with a result obtained by reading a servo pattern applied to the magnetic tape in advance, by the servo element.

12. The magnetic tape reading apparatus according to claim 11, wherein a reading operation by the reading head is performed in synchronous with a reading operation by the servo element.

13. An operation method of a magnetic tape reading apparatus including a reading head including a reading unit disposed at a position corresponding to a single track included in a magnetic tape, the method comprising:

controlling the reading unit to read data plural times from a range of the single track in a running direction of the magnetic tape by a linear scan method, the range being a part or an entirety of the single track; and synthesizing a plurality of reproducing signal sequences obtained by reading data plural times from the range by the reading unit wherein reading paths for plural times of reading operations with respect to the range by the reading unit are reading paths different from each other depending on environmental conditions affecting at least one of the magnetic tape or the reading unit for each of the plural times of reading operations in the range.

14. An operation method of a magnetic tape reading apparatus including a reading head which includes a plurality of reading units disposed at positions respectively corresponding to a plurality of tracks included in a magnetic tape and a first movement mechanism that moves the reading head in a width direction of the magnetic tape, the method comprising:

controlling each of the plurality of reading units to read data from a range of a single track having the corresponding position among the plurality of tracks, in a running direction of the magnetic tape, by a linear scan method to thereby control the reading head to read data plural times, the range being a part or an entirety of the single track;

wherein the magnetic tape has a plurality of sets of the plurality of tracks in a width direction, synthesizing a plurality of reproducing signal sequences obtained by reading data plural times from the range by the reading head, and controlling the first movement mechanism to move the reading head to a position where the plurality of reading units are to be disposed on the plurality of tracks of a designated set among the plurality of sets, and controls each of the plurality of reading units to read data plural times from the range of the single track of the designated set.

15. A non-transitory computer-readable storage medium storing a program for causing a computer to function as the controller and the synthesis unit included in the magnetic tape reading apparatus according to claim 1.

* * * * *